United States Patent
Davis et al.

(10) Patent No.: US 8,893,558 B2
(45) Date of Patent: *Nov. 25, 2014

(54) METHOD AND APPARATUS FOR MEASURING PARAMETERS OF A FLUID FLOWING WITHIN A PIPE USING A CONFIGURABLE ARRAY OF SENSORS

(75) Inventors: Michael A. Davis, Glastonbury, CT (US); Mark R. Fernald, Enfield, CT (US); Timothy J. Bailey, Longmeadow, MA (US)

(73) Assignee: CiDRA Corporate Services, Inc., Wallingford, CT (US)

(*) Notice: Subject to any disclaimer, the term of this patent is extended or adjusted under 35 U.S.C. 154(b) by 134 days.

This patent is subject to a terminal disclaimer.

(21) Appl. No.: 12/986,347

(22) Filed: Jan. 7, 2011

(65) Prior Publication Data

US 2011/0208447 A1    Aug. 25, 2011

Related U.S. Application Data

(63) Continuation of application No. 11/890,322, filed on Aug. 6, 2007, now Pat. No. 7,882,750, which is a continuation-in-part of application No. 10/909,592, filed on Aug. 2, 2004, now Pat. No. 7,253,742.

(60) Provisional application No. 60/491,824, filed on Aug. 1, 2003.

(51) Int. Cl.
*G01F 1/20* (2006.01)
*G01F 1/708* (2006.01)

(52) U.S. Cl.
CPC .................... *G01F 1/7082* (2013.01)

USPC ........................................................ 73/861.18

(58) Field of Classification Search
CPC .......... G01F 1/66; G01F 1/7082; G01F 1/712
See application file for complete search history.

(56) References Cited

U.S. PATENT DOCUMENTS

| | | |
|---|---|---|
| 4,048,853 A | 9/1977 | Smith et al. |
| 4,080,837 A | 3/1978 | Alexander et al. |
| 4,216,403 A | 8/1980 | Krempl et al. |
| 4,248,085 A | 2/1981 | Coulthard |
| 4,376,302 A | 3/1983 | Miller |
| 4,445,389 A | 5/1984 | Potzick et al. |
| 4,896,540 A | 1/1990 | Shakkottai et al. |
| 5,040,415 A | 8/1991 | Barkhoudarian |
| 5,083,452 A | 1/1992 | Hope |
| 5,218,197 A | 6/1993 | Carroll |
| 5,285,675 A | 2/1994 | Colgate et al. |
| 5,347,864 A * | 9/1994 | Senghaas et al. ............. 73/313 |

(Continued)

*Primary Examiner* — Lisa Caputo
*Assistant Examiner* — Nasir U Ahmed

(57) ABSTRACT

An apparatus for measuring at least one parameter associated with a fluid flowing within a pipe includes a single sheet of piezoelectric film material wrapped around at least a portion of the pipe and an array of sensors disposed at different locations on the film material. Each of the sensors provides a signal indicative of pressure within the pipe at a corresponding axial and/or circumferential location of the pipe. The sensors are selectively configurable to provide the pressure signals. The signals are processed to determine the parameter. The array of sensors is configurable in response to different criteria. The criteria includes at least one of the parameter of the fluid to be output, an input signal specifying sensors to be selected, a predetermined configuration based on the parameter to be determined, and in response to a previously determined parameter of the fluid.

45 Claims, 17 Drawing Sheets

(56) References Cited

U.S. PATENT DOCUMENTS

| | | | | |
|---|---|---|---|---|
| 5,367,911 | A | 11/1994 | Jewell et al. | |
| 5,398,542 | A | 3/1995 | Vasbinder | |
| 5,524,475 | A | 6/1996 | Kolpak et al. | |
| 5,526,844 | A | 6/1996 | Kamen et al. | |
| 5,591,922 | A | 1/1997 | Segeral et al. | |
| 5,741,980 | A | 4/1998 | Hill et al. | |
| 5,770,805 | A | 6/1998 | Castel | |
| 5,770,806 | A | 6/1998 | Hiismaki | |
| 5,835,884 | A | 11/1998 | Brown | |
| 5,845,033 | A | 12/1998 | Berthold et al. | |
| 5,874,672 | A | 2/1999 | Gerardi et al. | |
| 5,884,243 | A | 3/1999 | Taniguchi et al. | |
| 5,911,158 | A * | 6/1999 | Henderson et al. | 73/583 |
| 5,948,959 | A | 9/1999 | Peloquin | |
| 6,151,958 | A | 11/2000 | Letton et al. | |
| 6,202,494 | B1 | 3/2001 | Riebel et al. | |
| 6,231,516 | B1 | 5/2001 | Keilman et al. | |
| 6,279,406 | B1 * | 8/2001 | Li et al. | 73/861.77 |
| 6,289,746 | B1 | 9/2001 | Fu et al. | |
| 6,354,147 | B1 * | 3/2002 | Gysling et al. | 73/61.79 |
| 6,378,357 | B1 | 4/2002 | Han et al. | |
| 6,421,617 | B2 * | 7/2002 | Felsenstein et al. | 702/50 |
| 6,435,030 | B1 | 8/2002 | Gysling et al. | |
| 6,463,813 | B1 | 10/2002 | Gysling | |
| 6,536,291 | B1 | 3/2003 | Gysling et al. | |
| 6,550,342 | B2 | 4/2003 | Croteau et al. | |
| 6,587,798 | B2 | 7/2003 | Kersey et al. | |
| 6,597,946 | B2 | 7/2003 | Avrahami et al. | |
| 6,601,458 | B1 | 8/2003 | Gysling et al. | |
| 6,609,069 | B2 | 8/2003 | Gysling | |
| 6,691,584 | B2 | 2/2004 | Gysling et al. | |
| 6,732,575 | B2 | 5/2004 | Gysling et al. | |
| 6,782,150 | B2 | 8/2004 | Davis et al. | |
| 6,813,962 | B2 | 11/2004 | Gysling et al. | |
| 6,837,098 | B2 | 1/2005 | Gysling et al. | |
| 6,862,920 | B2 | 3/2005 | Gysling et al. | |
| 7,032,432 | B2 | 4/2006 | Gysling et al. | |
| 7,253,742 | B2 | 8/2007 | Davis et al. | |
| 7,882,750 | B2 * | 2/2011 | Davis et al. | 73/861.18 |
| 2002/0005108 | A1 * | 1/2002 | Ludwig | 84/600 |
| 2002/0095263 | A1 * | 7/2002 | Gysling | 702/45 |
| 2002/0123852 | A1 | 9/2002 | Gysling et al. | |
| 2002/0129662 | A1 | 9/2002 | Gysling et al. | |
| 2002/0194932 | A1 | 12/2002 | Gysling et al. | |
| 2003/0136186 | A1 | 7/2003 | Gysling | |
| 2003/0154036 | A1 | 8/2003 | Gysling et al. | |
| 2004/0016284 | A1 | 1/2004 | Gysling et al. | |
| 2004/0094021 | A1 * | 5/2004 | Ludwig | 84/625 |
| 2004/0210404 | A1 | 10/2004 | Gysling et al. | |
| 2004/0231431 | A1 | 11/2004 | Sullivan et al. | |
| 2005/0011258 | A1 | 1/2005 | Gysling et al. | |
| 2005/0012935 | A1 | 1/2005 | Kersey | |
| 2005/0039520 | A1 | 2/2005 | Davis et al. | |
| 2007/0083340 | A1 | 4/2007 | Bailey et al. | |

\* cited by examiner

METHOD AND APPARATUS FOR MEASURING PARAMETERS OF A FLUID FLOWING WITHIN A PIPE USING A CONFIGURABLE ARRAY OF SENSORS

CROSS-REFERENCE TO RELATED PATENT APPLICATIONS

This application is a continuation of patent application Ser. No. 11/890,322, filed Aug. 6, 2007 now U.S. Pat. No. 7,882,750, which is a continuation-in-part of U.S. patent application Ser. No. 10/909,592, filed on Aug. 2, 2004, now U.S. Pat. No. 7,253,742, which claimed the benefit of U.S. Provisional Patent Application No. 60/491,824, filed Aug. 1, 2003. The disclosures of these U.S. patent documents are incorporated by reference herein in their entireties.

TECHNICAL FIELD

This invention relates to an apparatus for measuring at least one parameter associated with a fluid flowing within a pipe, and more particularly to an apparatus including a configurable array of sensors for characterizing unsteady pressures in the fluid for use in determining at least one parameter associated with the fluid such as, for example, flow rate, volumetric flow rate, composition, speed of sound, velocity, mass flow rate, density and particle size of the fluid and health of a diagnosed component of the flow process.

BACKGROUND

A fluid flow process (flow process) includes any process that involves the flow of fluid through pipes, ducts, or other conduits, as well as through fluid control devices such as pumps, valves, orifices, heat exchangers, and the like. Flow processes are found in many different industries such as the oil and gas industry, refining, food and beverage industry, chemical and petrochemical industry, pulp and paper industry, power generation, pharmaceutical industry, and water and wastewater treatment industry. The fluid within the flow process may be a single phase fluid (e.g., gas, liquid or liquid/liquid mixture) and/or a multi-phase mixture (e.g. paper and pulp slurries or other solid/liquid mixtures). The multi-phase mixture may be a two-phase liquid/gas mixture, a solid/gas mixture or a solid/liquid mixture, gas entrained liquid or a three-phase mixture.

Various sensing technologies exist for measuring various physical parameters of single and/or multiphase fluids in an industrial flow process. Such physical parameters include, for example, flow rate, volumetric flow rate, composition, consistency, density, and mass flow rate.

In certain sensing applications, such as in industrial flow processes, it may be desirable to sense different parameters at different times and at different locations throughout the industrial flow process. For example, it may be desirable to periodically and temporarily sense volumetric flow at various locations to check the health and performance of the flow process. It may also be desirable to periodically validate the output of various meters throughout the flow process. Such requirements typically require the installation of many different types of flow meters throughout the flow process. The installation of these different meters can be costly and time consuming and may require that a portion of the flow process be shut down to install the sensors.

In any sensing application, it is necessary to detect and replace faulty sensors throughout the flow process. Any delay in detecting and replacing faulty sensors can jeopardize system reliability, and the replacement of sensors can be a costly and time consuming process.

Thus, there remains a need for a sensor for measuring various parameters of single and/or multiphase fluids in an industrial flow process that can be configured to sense different parameters and which reduces the cost and time associated with detecting and replacing faulty components.

SUMMARY OF THE INVENTION

The above-described and other needs are met by a method and apparatus for measuring a parameter of a fluid passing through a pipe including a spatial array of strain-based sensors disposed at different locations along the pipe such as, for example, different axial locations along the pipe and different circumferential locations about the pipe. Each of the strain-based sensors provides a pressure signal indicative of unsteady pressure within the pipe at a corresponding location of the pipe. A signal processor receives the pressure signals from each of the strain-based sensors, and determines a parameter of the fluid using the pressure signals from selected ones of the strain-based sensors. The parameter of the fluid may include, for example, at least one of: density of the fluid, flow rate, volumetric flow rate of the fluid, mass flow rate of the fluid, composition of the fluid, entrained air in the fluid, consistency of the fluid, size of particles in the fluid, and health of a device causing the unsteady pressures to be generated in the pipe.

The signal processor may select selected ones of the strain-based sensors using various criteria. For example, the signal processor may select selected ones of the strain-based sensors based on: a parameter of the fluid to be output by the signal processor; predetermined criteria corresponding to the parameter of the fluid; in response to a previously determined parameter of the fluid; in response to an input signal; in response to an indication of a faulty sensor; and in response to a condition associated with the pipe (e.g. vibration).

In one aspect of the invention an array of spaced-apart strain-based sensors is formed on a single sheet of polyvinylidene fluoride (PVDF). Each of the strain-based sensors comprises: a first electrode disposed on a first side of the sheet of PVDF, and a second electrode disposed on a second side of the sheet of PVDF opposite the first electrode. Each of the first and second electrodes may be formed as an elongated strip of conductive material. The first and second electrodes may extend around at least a portion of the outer surface of the pipe and substantially parallel to adjacent first and second electrodes. The elongated strip of conductive material may be formed from silver ink applied to the sheet of PVDF, and the first and second electrodes may be disposed between layers of a non-conductive material. A connector may be connected to each of the strain-based sensors, with the connector being electrically coupled to the signal processor.

In one embodiment, each of the strain-based sensors further comprises: a plurality of electrically connected first electrodes disposed on the first side of the sheet of PVDF, and a plurality of electrically connected second electrodes disposed on the second side of the sheet of PVDF opposite the plurality of first electrodes.

The foregoing and other objects, features and advantages of the present invention will become more apparent in light of the following detailed description of exemplary embodiments thereof.

BRIEF DESCRIPTION OF THE DRAWINGS

Referring now to the drawing wherein like items are numbered alike in the various Figures.

DETAILED DESCRIPTION

Figure 1:
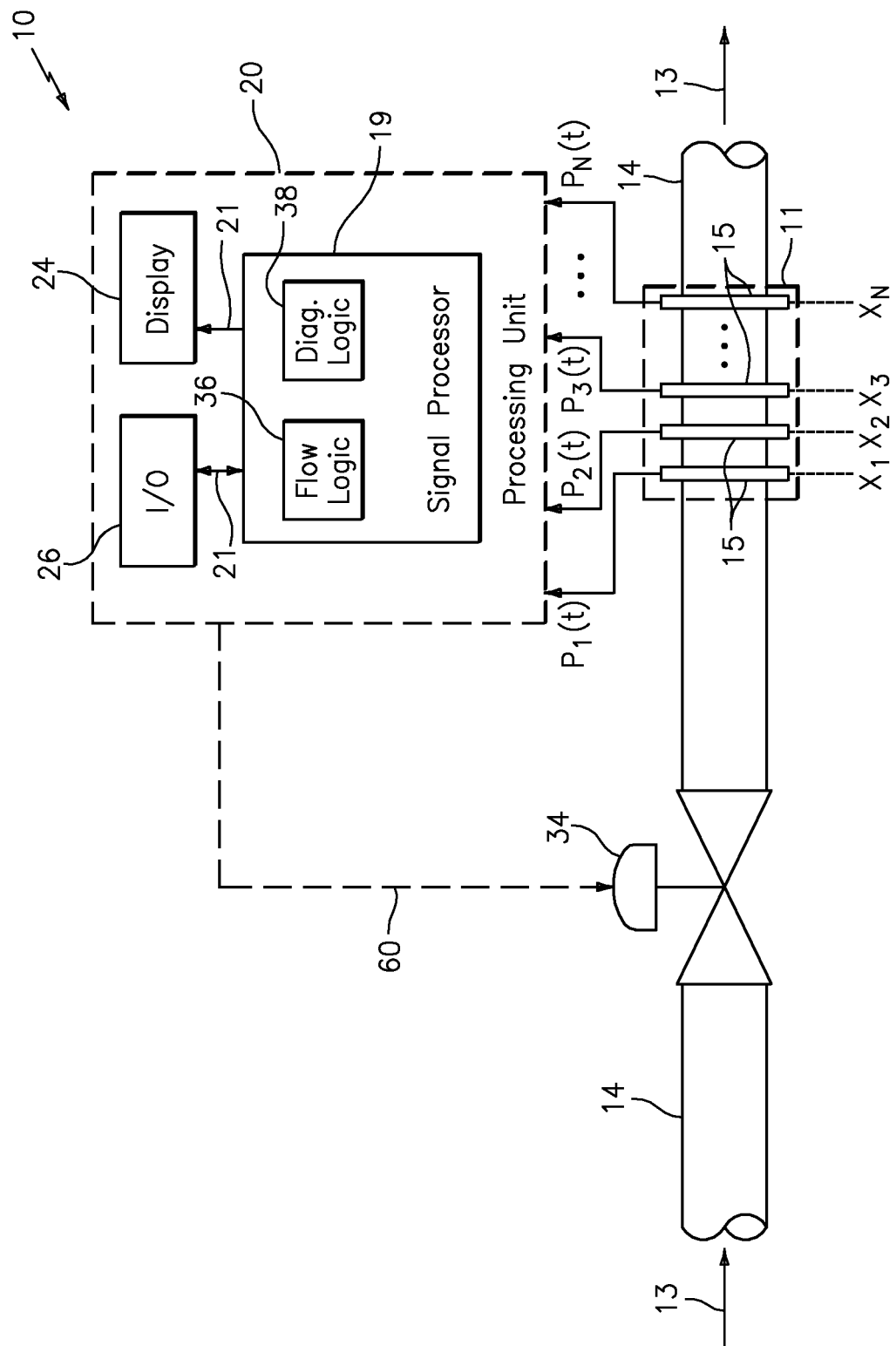
FIG. 1 is schematic diagram of an apparatus for determining at least one parameter associated with a fluid flowing in a pipe, the apparatus including a configurable array of sensors for characterizing unsteady pressures in the fluid, in accordance with various embodiments of the present invention.

As described in U.S. patent application Ser. Nos. 10/007, 749, 10/349,716, and 10/376,427, which are all incorporated herein by reference, unsteady pressures along a pipe, as may be caused by one or both of acoustic waves propagating through the fluid within the pipe and/or pressure disturbances that convect with the fluid flowing in the pipe (e.g., turbulent eddies and vortical disturbances), contain useful information regarding parameters of the fluid and the flow process. Referring to FIG. 1, an apparatus 10 for measuring at least one parameter associated with a fluid 13 flowing within a pipe 14 is shown. The parameter of the fluid may include, for example, at least one of: density of the fluid 13, flow rate of the fluid 13, volumetric flow rate of the fluid 13, mass flow rate of the fluid 13, speed of sound in the fluid 13, composition of the fluid 13, entrained air in the fluid 13, consistency of the fluid 13, size of particles in the fluid 13, and health of a device 34 causing the unsteady pressures to be generated in the pipe 14. The apparatus 10 includes at least one spatial array 11 of at least two strain-based sensors 15 disposed at different locations about the pipe. In one embodiment, illustrated in FIG. 1, the strain-based sensors 15 are disposed at different axial locations $x_1 \ldots x_N$ along the pipe 14. In another embodiment, illustrated in FIG. 16, the strain-based sensors 15 are disposed in different circumferential locations $\theta_1, \theta_2, \ldots \theta_N$ about a diameter of the pipe 14. Each of the strain-based sensors 15 provides a pressure signal P(t) indicative of unsteady pressure within the pipe 14 at a corresponding location (e.g., the aforementioned axial locations $x_1 \ldots x_N$ or circumferential locations $\theta_1, \ldots \theta_N$) of the pipe 14. A signal processor 19 receives the pressure signals $P_1(t) \ldots P_N(t)$ from the strain-based sensors 15 in the array 11, determines a parameter of the fluid 13 using pressure signals from selected ones of the sensors 15, and outputs the parameter as a signal 21. As will be described in further detail hereinafter, by selecting different strain-based sensors 15, the signal processor 19 can effectively reconfigure the array 11. As will also be described in further detail hereinafter, the array 11 of strain-based sensors 15 may be formed on a single sheet of polyvinylidene fluoride (PVDF) that is wrapped around at least a portion of an outer surface of the pipe 14. This arrangement allows a large number of strain-based sensors 15 to be quickly and economically installed on the outer surface of the pipe 14 without interrupting the flow process though the pipe.

It should be appreciated that the strain-based sensors 15 may include electrical strain gages, optical fibers and/or gratings, ported sensors, ultrasonic sensors, among other pressure sensors as described herein for sensing unsteady pressures in a pipe, as may be caused by one or both of acoustic waves propagating through fluid flowing within the pipe and/or pressure disturbances that convect with the fluid flow (e.g., turbulent eddies and vortical disturbances). It should also be appreciated that the strain-based sensors 15 may be attached to the pipe by adhesive, glue, epoxy, tape or other suitable attachment means to ensure suitable contact between the sensor and the pipe 14.

While the apparatus is shown as including four strain-based sensors 15, it is contemplated that the array 11 of sensors 15 includes two or more strain-based sensors 15, each providing a pressure signal P(t) indicative of unsteady pressure within the pipe 14 at a corresponding axial location along or circumferential location about the pipe 14. For example, the apparatus 10 may include 2, 3, 4, 5, 6, 7, 8, 9, 10, 11, 12, 13, 14, 15, 16, 17, 18, 19, 20, 21, 22, 23, or 24 strain-based sensors 15. Generally, the accuracy of the measurement improves as the number of sensors in the array increases. The degree of accuracy provided by the greater number of sensors is offset by the increase in complexity and time for computing the desired output parameter of the flow. Therefore, the number of sensors used is dependent at least on the degree of accuracy desired and the desired update rate of the output parameter provided by the apparatus 10. The fluid 13 may be a single or multiphase fluid flowing through a duct, conduit or other form of pipe 14.

The signals $P_1(t) \ldots P_N(t)$ provided by the strain-based sensors 15 in the array 11 are processed by the signal processor 19, which may be part of a larger processing unit 20. For example, the signal processor 19 may be a microprocessor and the processing unit 20 may be a personal computer or other general purpose computer configured as a standalone or networked device (e.g., coupled to a local or wide area communications network). It is contemplated that the signal processor 19 may be any one or more signal processing devices for executing programmed instructions, such as one or more microprocessors or application specific integrated circuits (ASICS), and may include memory for storing programmed instructions, set points, parameters, and for buffering or otherwise storing data.

Figure 2:
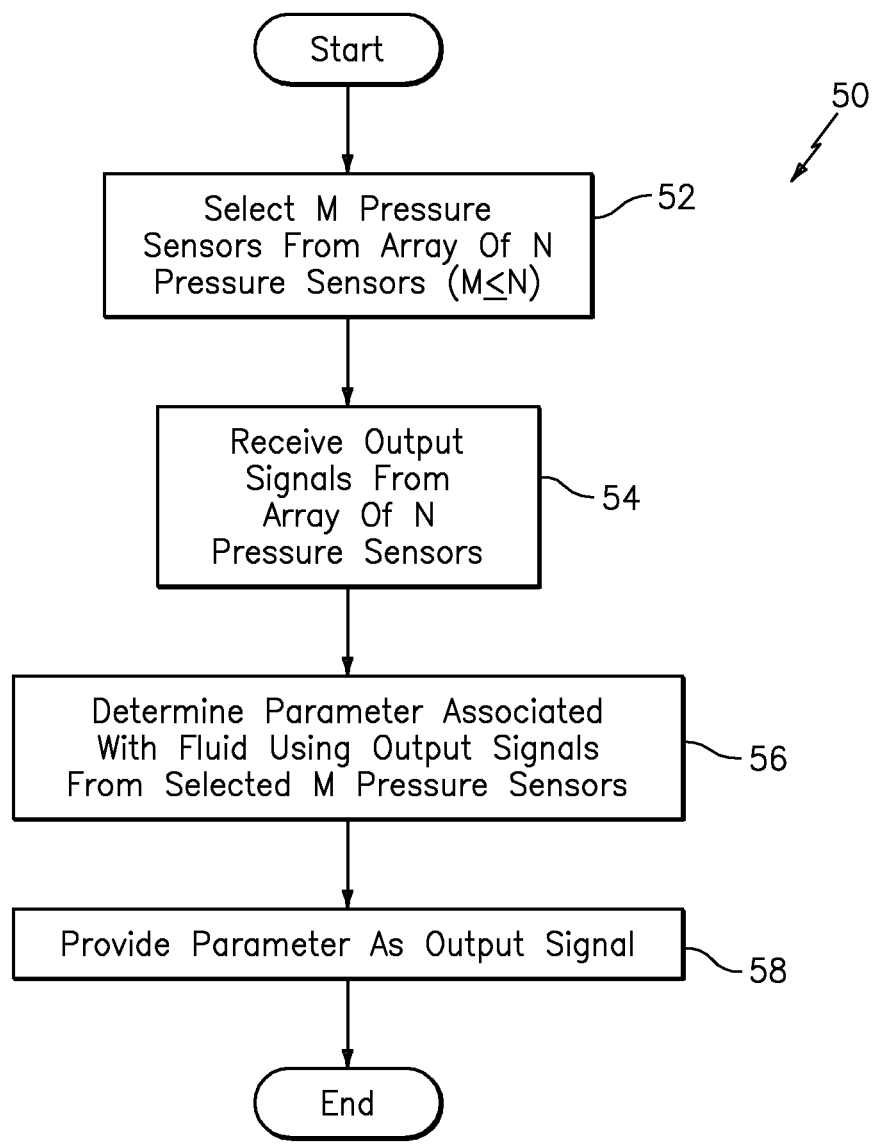
FIG. 2 is a block diagram of a method for determining at least one parameter associated with a fluid flowing in a pipe using a configurable array of sensors for characterizing the unsteady pressures in the fluid, in accordance with various embodiments of the present invention.

FIG. 2 is a block diagram of a method 50 employed by processing unit 20 for determining the parameter 21 associated with the fluid 13 flowing in pipe 14. Referring to FIGS. 1 and 2, the method 50 begins at block 52 with the selection of a group of M strain-based sensors 15 from the N sensors 15 in the array 11, where M is a number less than or equal to the number N. The signal processor receives pressure signals $P_1(t) \ldots P_N(t)$ from each of the N strain-based sensors 15 in the array 11 (block 54) and selectively processes the signals from the M selected strain-based sensors 15 to determine the parameter associated with the fluid 13 (block 56). The signal processor 19 then provides the parameter as an output signal 21 (block 58). While FIG. 2 depicts the step of selecting the group of M strain-based sensors 15 (block 52) as occurring before the receipt of output signals $P_1(t) \ldots P_N(t)$ from the array 11 of N strain-based sensors 15 (block 54), it is contemplated that the step of selecting (block 52) may follow the step of receiving (block 54).

To determine the one or more parameters 21 of the flow process, the signal processor 19 may apply the data from the M selected strain-based sensors 15 to flow logic 36 executed by signal processor 19. The one or more parameters 21 may include parameters such as, for example, flow rate, volumetric flow rate, mass flow rate, density, composition, entrained air, consistency, particle size, velocity, mach number, speed of sound propagating through the fluid 13, and/or other parameters of the fluid 13. The flow logic 36 is described in further detail hereinafter.

The signal processor 19 may also apply one or more of the signals $P_1(t) \ldots P_N(t)$ from the strain-based sensors 15 and/or one or more parameters 21 from the flow logic 36 to diagnostic logic 38. The diagnostic logic 38 is executed by the signal processor 19 to, for example, diagnose a health of any device 34 in the process flow that causes unsteady pressures to be generated in the pipe 14. In FIG. 1, device 34 is depicted as a valve; however, it is contemplated that device 34 may be any machinery, component, or equipment, e.g., motor, fan, pump, generator, engine, gearbox, belt, drive, pulley, hanger, clamp, actuator, valve, meter, or the like. The signal processor 19 may output one or more parameters 21 indicative of the health of the diagnosed device 34. The signal processor 19 may also output a control signal 60 to control the device 34 in response to the parameter 21. The diagnostic logic 38 is described in further detail hereinafter.

The signal processor 19 may output the one or more parameters 21 to a display 24 or another input/output (I/O) device 26. The I/O device 26 also accepts user input parameters 48 as may be necessary for the flow logic 36 and diagnostic logic 38. The I/O device 26, the display 24, and the signal processor 19 unit may be mounted in a common housing, which may be attached to the sensor array 11 by a flexible cable (e.g., wired), wireless communication connection, or the like. The flexible cable may also be used to provide operating power from the processing unit 20 to the sensor array 11 if necessary.

By selecting different strain-based sensors 15, the signal processor effectively reconfigures the array 11. That is, by adjusting the number or order of input signals P(t) used to determine the parameter 21, the signal processor 19 effectively adjusts the number of strain-based sensors 15 in the array 11. For example, the signal processor 19 may select three, four, eight, sixteen, twenty four, or M number of the N sensors 15 and apply the data from the selected strain-based sensors 15 to determine the parameter 21, where M is a number less than or equal to N. Generally, the accuracy of the measurement improves as the number of sensors selected by the signal processor 19 increases. The degree of accuracy provided by the greater number of sensors is offset by the increase in complexity and time for computing the desired output parameter of the flow. Therefore, the number of sensors selected is dependent at least on the degree of accuracy desired and the desired update rate of the output parameter provided by the apparatus 10.

In addition, by selecting strain-based sensors 15 that are closer together or farther apart along the longitudinal axis of the pipe 14, the signal processor 19 effectively adjusts the aperture (distance along the axis of the pipe 14) between adjacent sensors 15 in the array 11. For example, the signal processor 19 may select sensors 15 at axial positions $X_1$ and $X_2$ for closer spacing, and sensors 15 at axial positions $X_1$ and $X_4$ for farther spacing. Also, the signal processor 19 may select sensors 15 to provide an array of evenly spaced sensors (e.g., sensors at axial positions $X_1$, $X_3$, $X_5$, $X_7$ . . . ) or to provide an array of unevenly spaced sensors (e.g., sensors at axial positions $X_1$, $X_2$, $X_4$, $X_7$ . . . ). As described below with reference to FIGS. 6 and 16, the array of sensors 15 may include sensors 15 and/or sensor segments 76 disposed circumferentially about a diameter of the pipe 14. It should be appreciated that the signal processor 19 may reconfigure the array 11 by selecting sensors 15 and/or segments 76 at different circumferential locations about the diameter of the pipe 14 to determine a complete or partial circumferential measurement of induced strain on the pipe 14 when computing the desired output parameter of the flow.

Figure 18:
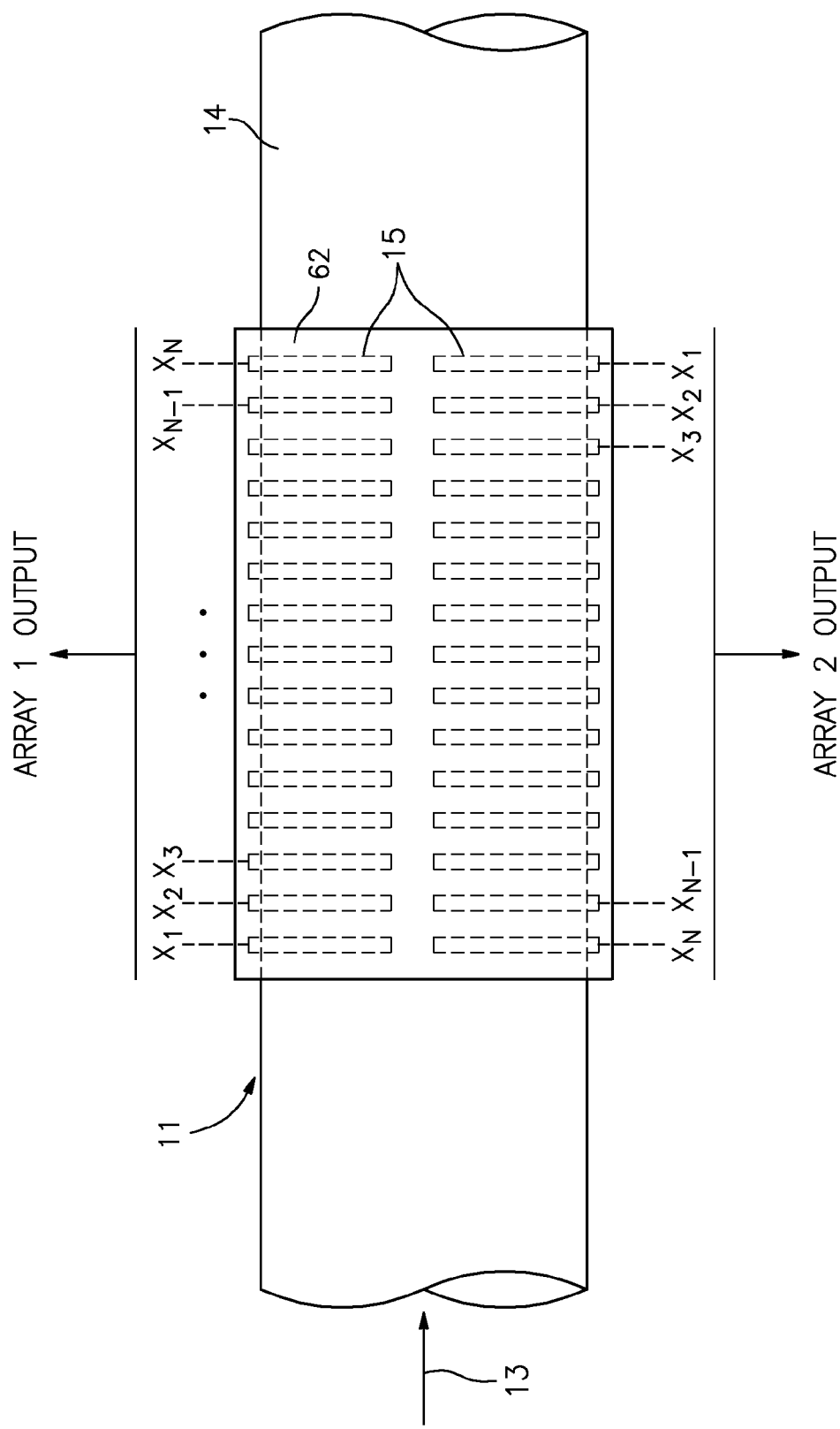
FIG. 18 is a plan view of two arrays of sensors wrapped around an external surface of the pipe for measuring pressure in a forward and a reverse direction of the flow.
Figure 19:
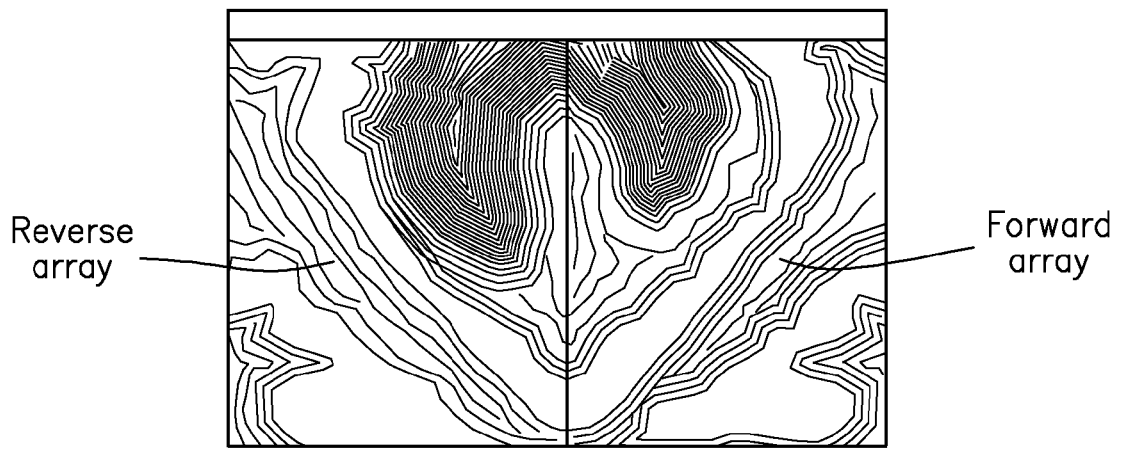
FIG. 19 is a k-$\omega$ plot of data processed from the two arrays of sensors of FIG. 18 that illustrates a forward and a reverse convective ridge.

As described above, it is within the scope of the present invention to selectively configure the array 11 to select sensors at different axial and/or circumferential locations. Additionally, it is also within the scope of the present invention to selectively configure an order of sensors 15 with the array 11. For example, with reference to FIG. 5, it is within the scope of the present invention to select sensors at axial locations $x_1$, $x_2$, . . . $x_N$ to measure pressure in a direction of the flow 13, and to also select sensors at axial locations $x_n$, $x_{n-1}$, . . . , $x_2$, $x_1$ to measure pressure in a direction against the flow 13. In one embodiment, switching logic, as is generally known in the art, is employed to selectively connect the sensors 15 to the processor 19 to receive signals from a forward sensing of the flow 13 (processing signals from locations $x_1$, $x_2$, . . . $x_N$) or from a reverse sensing of the flow 13 (processing signals from locations $x_n$, $x_{n-1}$, . . . , $x_2$, $x_1$). In another embodiment of the present invention, illustrated in FIG. 18, it is within the scope of the present invention to utilize two sensor arrays, labeled Array 1 and Array 2, to measure pressure in the flow 13. As shown in FIG. 18, Array 1 is wired in a direction of the flow 13 (e.g., in that a sensor 15 at axial position $x_1$ is encountered first) and Array 2 is wired in a reverse direction of the flow 13 (e.g., in that a sensor at axial position $x_n$ is encountered first). The output signals of both Array 1 and Array 2 are connected to one processor 19. As such, the processor 19 receives processing signals for the sensor array in the forward direction (with flow 13), Array 1, and signals for the sensor array in the reverse direction (against flow 13), Array 2, and generates convective ridges (as described below) in both the forward direction and the reverse direction. FIG. 19 illustrates the forward and reverse ridges.

It should be appreciated that this method of connecting a forward array of sensors 15 and a reverse array of sensors 15 spatially separates the acquired data and allows for simultaneous processing. The inventors have discovered that simultaneously processing signals from the arrays (e.g., Array 1 output and Array 2 output) overcomes coincident mapping problems that typically occur without spatial separation.

Additionally, the processor 19 may reconfigure the array 11 in response to any number of criteria. For example, in one embodiment the signal processor 19 may select one or more of the strain-based sensors 15 in response to an indication of a faulty strain-based sensor 15. For example, the signal processor 19 may compare the output signal of each strain-based sensor 15 to a predetermined criteria (e.g., voltage level), and if the output signal indicates that a sensor 15 is faulty (e.g., if the output signal is outside the predetermined criteria) then the signal processor 19 may disregard output signals from the faulty strain-based sensor 15. By identifying and eliminating faulty sensors 15, the overall reliability of the apparatus 10 is increased. The signal processor 19 may also replace the faulty sensor 15 with another sensor 15. For example, if the signal processor 19 is applying the signals from an array of eight sensors 15 to determine the parameter 21 and one of the sensors 15 is determined to be faulty, the signal processor 19 may select a different sensor 15 to replace the faulty sensor 15 in the array of eight sensors 15.

In another embodiment, the signal processor 19 selects the strain-based sensors 15 based on the parameter 21 to be output by the signal processor 19. For example, the signal processor 19 may use the output signals from a set of M strain-based sensors 15 for determining one parameter 21 (e.g., flow rate) and a different set of M sensors 15 for determining another parameter 21 (e.g., speed of sound). This allows the number of strain-based sensors 15, the aperture (distance along the axis of the pipe 14) between adjacent sensors 15, or a circumferential measurement (different circumferential locations about the diameter of the pipe 14) to be optimized for each different parameter 21. The set of M sensors 15 for a given parameter 21 may be predetermined, or the set of M sensors 15 for a given parameter 21 may be determined in response to a previously-determined value of the parameter 21 of the fluid 13. For example, if the desired output parameter 15 is the flow rate of the fluid 13, the number and/or aperture of the sensors 15 used to determine the flow rate may be adjusted based on a previously determined velocity of the fluid 13. In another example, if a previous attempt at obtaining an output parameter 21 was unsuccessful or provided unacceptable results, the number, aperture and/or circumferential locations of the sensors 15 may be adjusted in attempt to obtain acceptable results. It should be appreciated that the adjustment in the number, aperture and/or circumferential location of the sensors 15 can be performed by the signal processor 19 in real-time.

In another embodiment, the signal processor 19 may select a subset of the strain-based sensors 15 in response to an input signal 48 received from the I/O device 26. The input signal 48 may indicate the parameter 21 to be determined by the signal processor 19, in which case the signal processor 19 may select the strain-based sensors 15 as described above. Alternatively, the input signal 48 may indicate the sensors 15 that are to be used by the signal processor 19 in determining a particular parameter 21. This latter embodiment may be particularly useful by, for example, a technician installing or trouble-shooting the apparatus 10, or upgrading the apparatus 10 with new functionality.

In yet another embodiment, the signal processor 19 may select selected ones of the strain-based sensors 15 to provide spatial filtering of conditions associated with the pipe 14. For example, if it is desired for the sensors 15 to sense the strain in the pipe 14 due to pressure fluctuations but a large vibration in the pipe 14 exists, the vibration may mask the pressure fluctuation signal. By only utilizing sensors 15 which are in the nodes of the pipe 14 vibration, the vibration based strains are minimized and the pressure fluctuation strains are more accurately measured.

Referring again to FIG. 1, and as noted above, the strain-based sensors 15 may include electrical strain gages, optical fibers and/or gratings, ported sensors, ultrasonic sensors, among other pressure sensors as described herein, and may be attached to the pipe by adhesive, glue, epoxy, tape or other suitable attachment means to ensure suitable contact between the sensor and the pipe 14. The sensors 15 may alternatively be removable or permanently attached via known mechanical techniques such as mechanical fastener, spring loaded, clamped, clam shell arrangement, strapping or other equivalents. Alternatively, strain gages, including optical fibers and/or gratings, may be embedded in a composite pipe 14. If desired, for certain applications, gratings may be detached from (or strain or acoustically isolated from) the pipe 14 if desired.

It is also within the scope of the present invention that any other strain sensing technique may be used to measure the variations in strain in the pipe 14 such as, for example, highly sensitive piezoelectric, electronic or electric, strain gages attached to or embedded in the pipe 14.

In certain embodiments of the present invention, a piezoelectronic pressure transducer may be used as one or more of the strain-based sensors and it may measure the unsteady (or dynamic or ac) pressure variations inside the pipe 14 by measuring the pressure levels inside of the pipe. In an embodiment of the present invention, the sensors 14 comprise strain-based sensors manufactured by PCB Piezotronics of Depew, N.Y. In one strain-based sensor embodiment, there are integrated circuit piezoelectric voltage mode-type sensors that feature built-in microelectronic amplifiers that convert the high-impedance charge into a low-impedance voltage output. Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems. The inventors have discovered that the Model 106B sensor has the unique capability to measure small pressure changes of less than 0.001 psi under high static conditions. The Model 106B sensor has a 300 mV/psi sensitivity and a resolution of 91 dB (0.0001 psi).

In one embodiment, the strain-based sensors 15 may incorporate a built-in MOSFET microelectronic amplifier to convert the high-impedance charge output into a low-impedance voltage signal. The sensors 15 may be powered from a constant-current source and can operate over long coaxial or ribbon cable without signal degradation. The inventors have discovered that the low-impedance voltage signal is not affected by triboelectric cable noise or insulation resistance-degrading contaminants. Power to operate integrated circuit piezoelectric sensors generally takes the form of a low-cost, 24 to 27 VDC, 2 to 20 mA constant-current supply.

Most piezoelectric pressure sensors are constructed with either compression mode quartz crystals preloaded in a rigid housing, or unconstrained tourmaline crystals. These designs give the sensors microsecond response times and resonant frequencies in the hundreds of kHz, with minimal overshoot or ringing. Small diaphragm diameters ensure spatial resolution of narrow shock waves.

The output characteristic of piezoelectric pressure sensor systems is that of an AC-coupled system, where repetitive signals decay until there is an equal area above and below the original base line. As magnitude levels of the monitored event fluctuate, the output remains stabilized around the base line with the positive and negative areas of the curve remaining equal.

Furthermore the present invention contemplates that each of the strain-based sensors 15 may include a piezoelectric sensor that provides a piezoelectric material to measure the unsteady pressures of the fluid 13. The piezoelectric material, such as the polymer, polarized fluoropolymer PVDF, measures the strain induced within the process pipe 14 due to unsteady pressure variations within the fluid 13. Strain within the pipe 14 is transduced to an output voltage or current by the attached piezoelectric sensors 15.

The PVDF material forming each piezoelectric sensor 15 may be adhered to the outer surface of a steel strap that extends around and clamps onto the outer surface of the pipe 14. The piezoelectric sensing element is typically conformal to allow complete or nearly complete circumferential measurement of induced strain. The sensors can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The advantages of this technique are the following.

1. Non-intrusive flow rate measurements.
2. Low cost.
3. Measurement technique requires no excitation source. Ambient flow noise is used as a source.
4. Flexible piezoelectric sensors can be mounted in a variety of configurations to enhance signal detection schemes. These configurations include a) co-located sensors, b) segmented sensors with opposing polarity configurations, c) wide sensors to enhance acoustic signal detection and minimize vortical noise detection, d) tailored sensor geometries to minimize sensitivity to pipe modes, e) differencing of sensors to eliminate acoustic noise from vortical signals.
5. Higher Temperatures (140C) (co-polymers)

Figure 3:
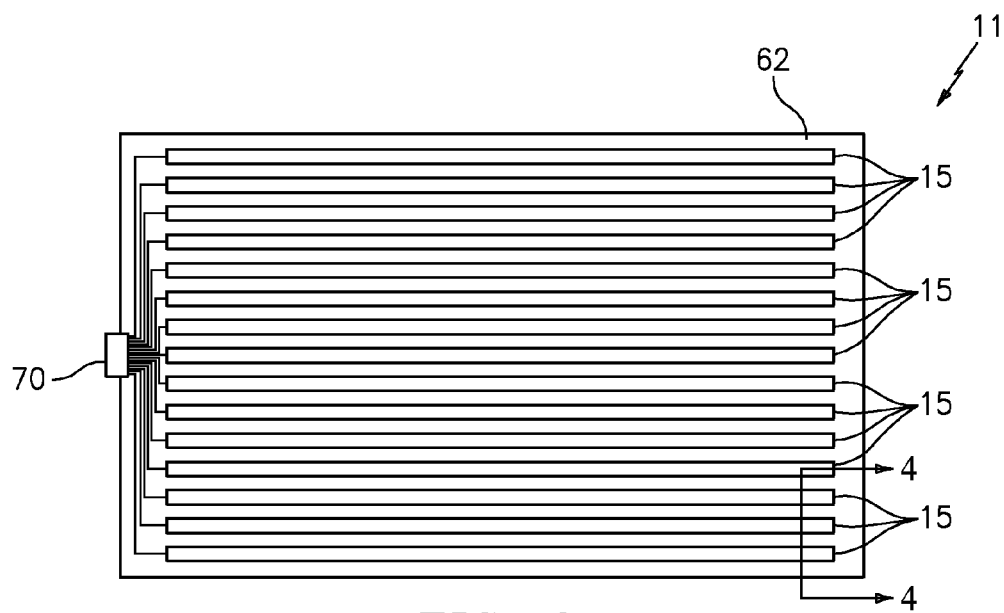
FIG. 3 is a plan view of a portion of the configurable array of sensors in accordance with various embodiments of the present invention.
Figure 4:
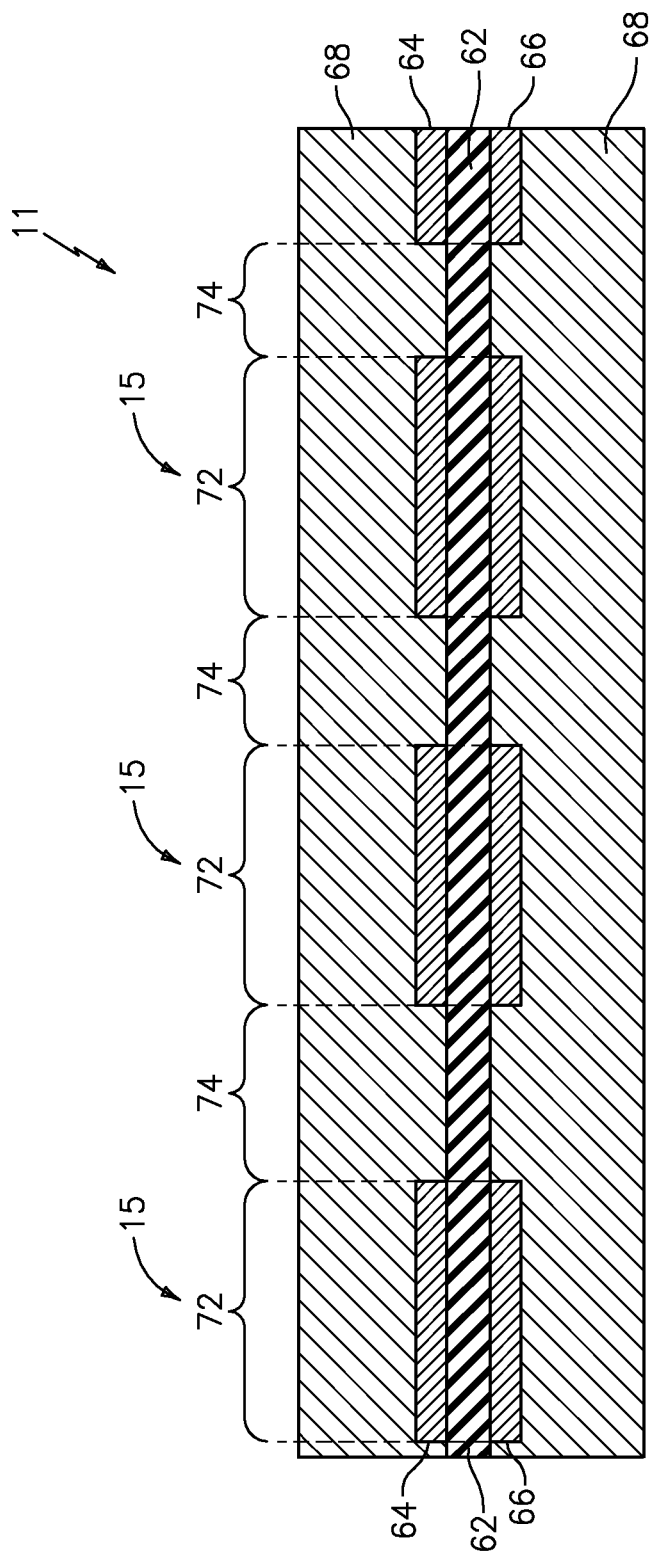
FIG. 4 is a cross-sectional elevation view of the configurable array of sensors taken along section 4-4 of FIG. 3.

Referring to FIG. 3, in accordance with one aspect of the present invention, the array 11 of strain-based sensors 15 is formed on a single sheet 62 of PVDF. FIG. 4 shows a cross-sectional elevation view of a portion of the array 11 of strain-based sensors 15, as taken along section 4-4 of FIG. 3. Referring to FIGS. 3 and 4, the sheet 62 of PVDF has a plurality of strain-based sensors 15 formed thereon, with each of the strain-based sensors 15 being formed by a first electrode 64 disposed on a first side of the sheet 62 of PVDF, and a second electrode 66 disposed on a second side of the sheet 62 of PVDF opposite the first electrode 64. In the embodiment shown, each of the first and second electrodes 64, 66 is formed as an elongated strip of conductive material of substantially the same length, width, and thickness. The first and second electrodes 64, 66 forming each strain-based sensor 15 are substantially parallel to the first and second electrodes 64, 66 forming the adjacent strain-based sensors 15.

In one embodiment, the first and second electrodes 64, 66 and the sheet 62 of PVDF may be disposed between layers of a non-conductive material 68, which acts to protect the PVDF sheet 62 and the electrodes 64, 66 and prevents an electrical short between the electrodes and any external conductor.

The first and second electrodes 64, 66 may be formed from any flexible, conductive material. For example, each elongated strip of conductive material forming the first and second electrodes 64, 66 may be formed from silver ink applied to the sheet 62 of PVDF. A variety of masking techniques can be used to easily permit the deposition of the electrodes 64, 66 used in specific areas. For example, each elongated strip of conductive material may be formed by silk screening a silver ink coating on the sheet 62. In addition, the electrode deposition process can be used to route the various sensors 15 to a common location for easy attachment to a connector 70 (FIG. 3) for connection to the signal processor 19 or processing unit 20 (FIG. 1).

As shown in FIG. 4, each first and second electrode 64, 66 forms an "active" sensing area 72. The sheet 62 of PVDF also includes non-sensitive areas 74 separating adjacent active sensing areas 72. The ability to form a plurality of sensors 15 on a single sheet 62 of PVDF is possible due to an interesting property of the PVDF material. That is, since the PVDF material is non-conductive, it will create only a local charge in response to a local strain (or temperature difference). Thus, when conductive electrodes 64, 66 are placed covering an area of the PVDF material, it will become an integrating sensor for detecting strain and/or temperature differences only over the area covered by the electrodes 64, 66. The non-covered area (i.e., the non-sensitive areas 74) will not influence the charge accumulation in the active sensing areas 72. This behavior permits multiple independent sensors 15 to be created on a single sheet 62 of PVDF by only applying the electrodes 64, 66 in specific areas.

Figure 5:
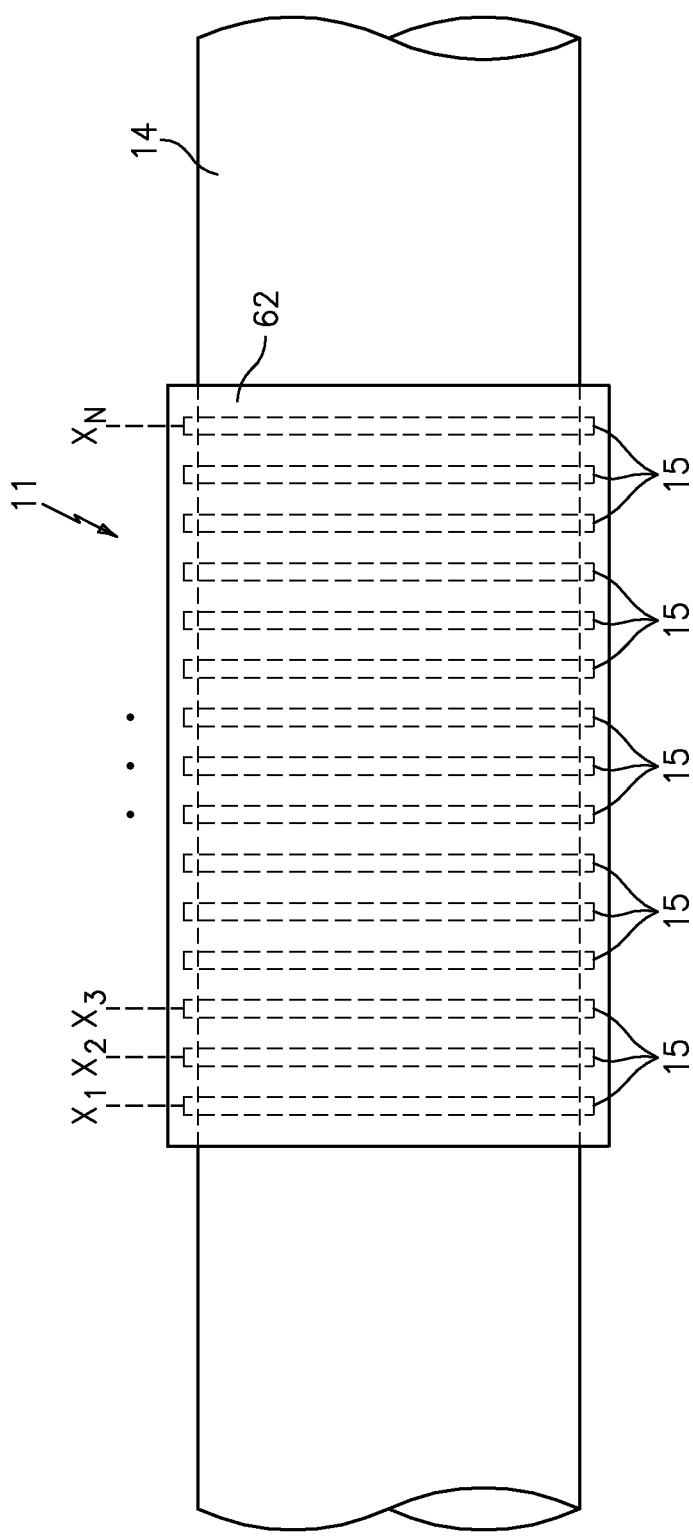
FIG. 5 is a plan view of the configurable array of sensors wrapped around an external surface of the pipe.

Referring to FIG. 5, the sheet 62 is shown wrapped around an outer surface of the pipe 14 such that each sensor 15 extends radially around at least a portion of the outer surface. Each sensor 15 extends substantially fully around the outer surface of the pipe 14, which allows each sensor 15 to sense the circumferential average of unsteady pressures at a corresponding one of the axial locations $x_1, \ldots x_N$ and, therefore, reduce measurement errors associated with vibration or bending modes of the pipe 14.

By forming multiple sensors 15 on a single PVDF sheet 62, installation of the sensors 15 is accomplished by simply wrapping the sheet 15 around the pipe 14. The PVDF sheet 62 can be directly wrapped around the pipe 14 with an electrically insulative sheet between the sheet 62 and the pipe 14. Alternatively, the PVDF sheet 62 may be attached to the inner or outer surface of a sheet of material (e.g., a stainless steel sheet) which, in turn, is wrapped around and clamped onto the pipe 14, similar to that described in U.S. patent application Ser. No. 10/795,111, filed on Mar. 4, 2004, which is incorporated herein by reference. This reduces the time and effort previously associated with installing an array 11 of strain-based sensors 15 on a pipe 14.

In addition, with the sheet 62 of the present invention, the installation and manufacturing costs are substantially the same regardless of the number of sensors 15 disposed on the sheet 62. Thus, the sheet 62 is particularly advantageous for the apparatus 10 having a configurable (selectable) array 11 of strain-based sensors 15. By having a large number of strain-based sensors 15, the configurability of the array 11 is greatly increased.

Figure 6:
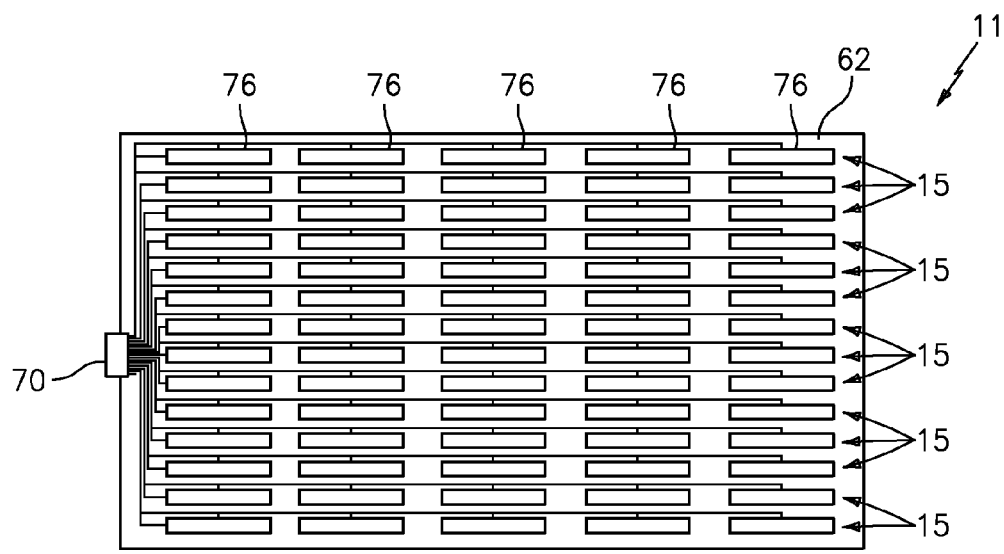
FIG. 6 is a plan view of an alternative configurable array of sensors in accordance with various embodiments of the present invention.

Referring to FIG. 6, one embodiment of the apparatus 10 is shown wherein the first and second electrodes 64, 66 of each of the strain-based sensors 15 include a plurality of segments 76. As shown in FIG. 6, each segment 76 is electrically connected to an adjacent segment 76 via a bus 71. In one embodiment, each bus 71 is electrically connected to a single connector 70 on the end of the PVDF sheet 62. Similar to the embodiment illustrated in FIG. 4, the segments 76 of the first and second electrodes 64, 66 are paired to form sensing areas 72 at different locations. When wrapped around an outer surface of the pipe 14, the segments 76 form sensing areas 72 at different circumferential locations such that the sensors 15 (e.g., the segments 76) cooperate to provide a complete or partial circumferential measurement of induced strain on the pipe 14 when computing the desired output parameter of the flow.

Figure 16:
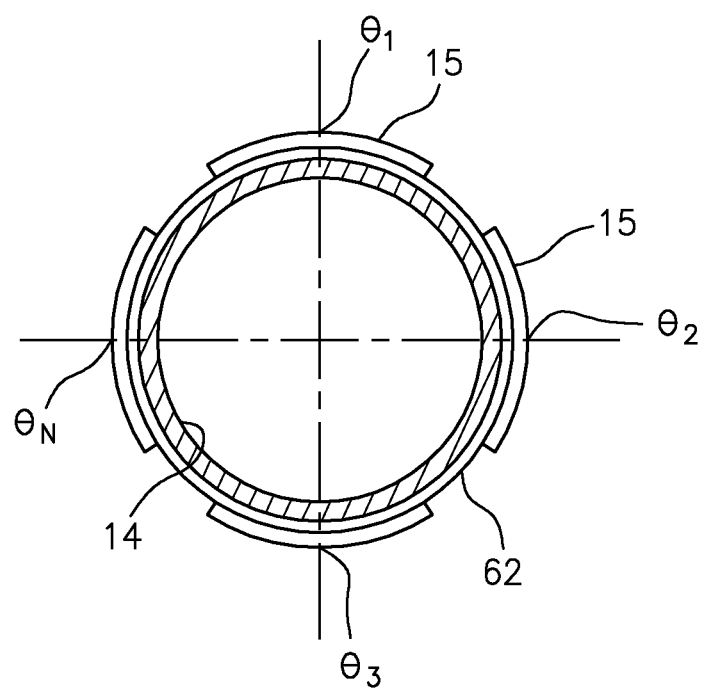
FIG. 16 is a partial cross-section view of the configurable array of sensors wrapped around an external surface of the pipe.

While described above as cooperating to form a segmented sensor 15, in another embodiment, each of the segments 76 is individually selectable as one of an array of strain-based sensors 15 disposed at different circumferential locations about the pipe 14. For example, FIG. 16 illustrates a plurality of sensors 15 disposed at different circumferential locations $\theta_1, \theta_2, \ldots, \theta_N$ about an outer surface of the pipe 14. In this embodiment, the sensors 15 are each electrically connected to the connector 70 and the signal processor 19. In one embodiment, the configuration of sensors 15 at differential circumferential locations $\theta_1, \theta_2, \ldots, \theta_N$ is present at each of the aforementioned axial locations $x_1 \ldots x_N$ such that the array of sensors 15 is comprised of a plurality of sensors 15 in both axial and circumferential locations about the pipe 14.

Figure 17A:
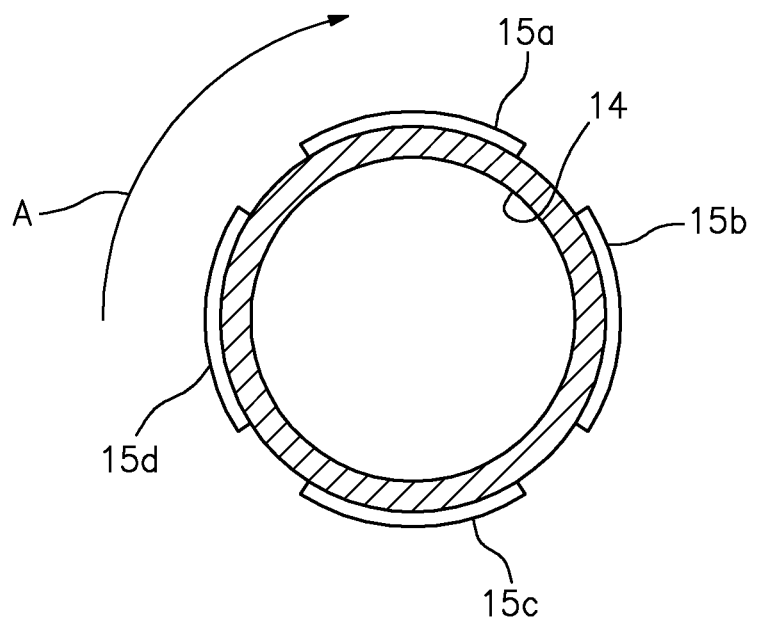
FIGS. 17A and 17B are partial cross-section views of the configurable array of sensors wrapped around an external surface of the pipe, depicting adaptability of the array to a rotation of the pipe.
Figure 17B:
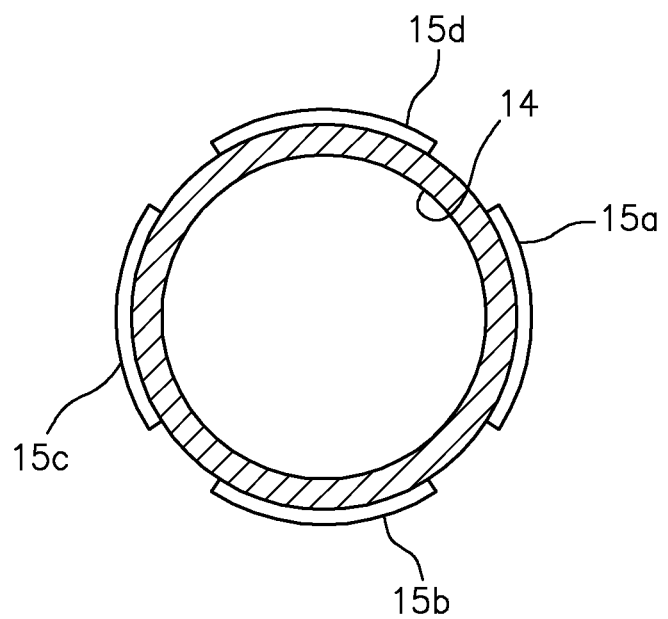

The inventors have discovered that disposing sensors 15 at different circumferential locations is desirable in particular process flow applications. For example, in process flows where highly abrasive mixtures are flowing through a pipe, a distribution of particle masses within the flow can result in high wear in one circumferential location of the pipe (e.g., a bottom inside surface of the pipe). In such applications, technicians may wish to rotate the pipe to even distribute wear and thus extend the useful life of the pipe. Currently, when the pipe is rotated, flow sensors disposed on outer surfaces of the pipe must also be rotated such that the sensors maintain their prior angular orientation with respect to the flow through the pipe. As can be appreciated, it is desirable to minimize, if not eliminate, the need to rotate and realign the sensors 15 each time the pipe is rotated. In one aspect of the present invention, having a configurable array of strain-based sensors 15 disposed at different circumferential locations about the pipe 14 addresses this need. For example, as is shown in FIG. 17A, a first set of sensors 15a-15d are configured for evaluating the flow process through the pipe 14. After a rotation of the pipe 14 in a direction illustrated by arrow A (FIG. 17A), the first set of sensors 15a-15d are no longer disposed at a first circumferential location (e.g., sensor 15a sensing flow at the top of the pipe and sensor 15c sensing flow at the bottom of the pipe) to the flow but have instead been rotated ninety degrees (90°) (FIG. 17B). In accordance with one embodiment of the present invention, a second set of sensors, e.g., sensors 15d and 15b, are selected and configured to evaluate the flow at the top and bottom of the pipe, respectively. As such, the ability to sense the flow is effectively altered by reconfiguring the array of sensors 15a-15d in response to the rotation of the pipe 14 without the need for technicians to physical rotation sensors.

It should be appreciated that while described above as responding to a ninety degree (90°) rotation of the pipe and sensors, it is within the scope of the present invention for the array f sensors to adapt to any rotation of the pipe.

Diagnostic Logic

Figure 7:
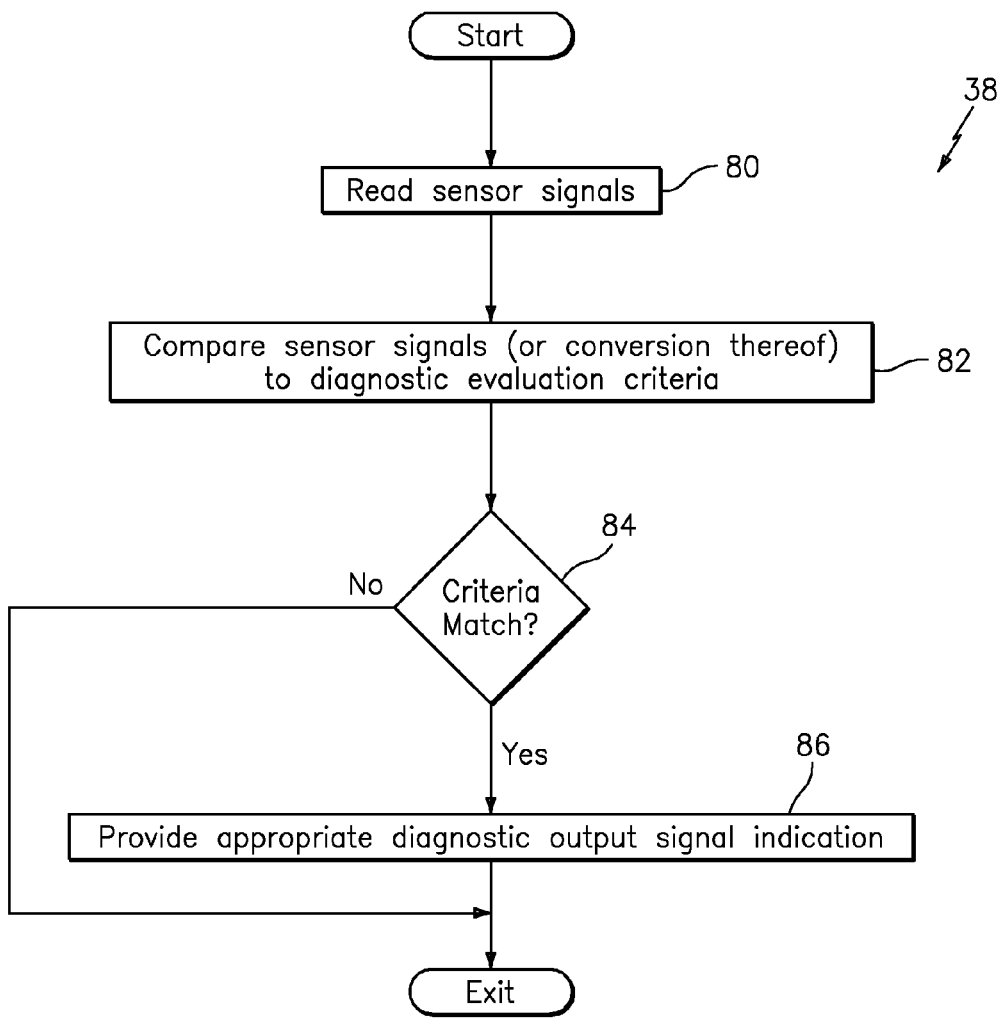
FIG. 7 is a block diagram of a diagnostic logic used in the apparatus of the present invention.

Referring to FIG. 7 the diagnostic logic 38 measures the sensor input signals (or evaluation input signals), which may include one or more of the signals $P_1(t), P_2(t), P_3(t), \ldots P_N(t)$ and the parameters 21, at a step 80. Next, the diagnostic logic 38 compares the evaluation input signals to a diagnostic evaluation criteria at a step 82, discussed hereinafter. Then, a step 84 checks if there is a match, and if so, a step 86 provides a diagnostic signal indicative of the diagnostic condition that has been detected and may also provide information identifying the diagnosed device. The diagnostic signal may be output as a parameter 21.

Where the evaluation input signal is a parameter 21, as may be output from the flow logic 36, the diagnostic evaluation criteria may be based on a threshold value of the flow signal 21. For example, the threshold value may be indicative of a maximum or minimum sound speed, mach number, consistency, composition, entrained air, density, flow rate, mass flow rate, volumetric flow rate, or the like. If there is not a criteria match in step 84, the diagnostic logic 38 exits.

Where the evaluation input signal includes one or more signals $P_1(t), P_2(t), P_3(t), \ldots P_N(t)$, the diagnostic evaluation criteria may be a threshold (maximum or minimum) pressure. Alternatively, the diagnostic evaluation criteria may be based on an acoustic signature, or a convective property (i.e., a property that propagates or convects with the flow). For example, the diagnostic logic 38 may monitor the acoustic signature of any upstream or downstream device (e.g., motor, fan, pump, generator, engine, gear box, belt drive, pulley, hanger, clamp, actuator, valve, meter, or other machinery, equipment or component). Further, the data from the array 11 may be processed in any domain, including the frequency/spatial domain, the temporal/spatial domain, the temporal/wave-number domain, or the wave-number/frequency (k-ω) domain or other domain, or any combination of one or more of the above. As such, any known array processing technique in any of these or other related domains may be used if desired.

For example, for three unsteady pressure signals, the equations in the frequency/spatial domain equation would be: $P(x,\omega)=Ae^{-ik_r x}+Be^{+ik_r x}$; the temporal/spatial domain would be: $P(x,t)=(Ae^{-ik_r x}+Be^{+ik_r x})e^{i\omega t}$; and the k-ω domain (taking the spatial Fourier transform) would be:

$$P(k, \omega) = \frac{1}{2\pi}\int_{-\infty}^{+\infty} P(x, \omega)e^{ikx}\,dx = A(\omega)\delta\left(k - \frac{\omega}{a}\right) + B(\omega)\delta\left(k + \frac{\omega}{a}\right)$$

where k is the wave number, a is the speed of sound of the material, x is the location along the pipe, ω is frequency (in rad/sec, where ω=2πf), and δ is the Dirac delta function, which shows a spatial/temporal mapping of the acoustic field in the k-ω plane.

Any technique known in the art for using a spatial (or phased) array of sensors to determine the acoustic or convective fields, beam forming, or other signal processing techniques, may be used to provide an input evaluation signal to be compared to the diagnostic evaluation criteria.

Flow Logic

Velocity Processing

Figure 8:
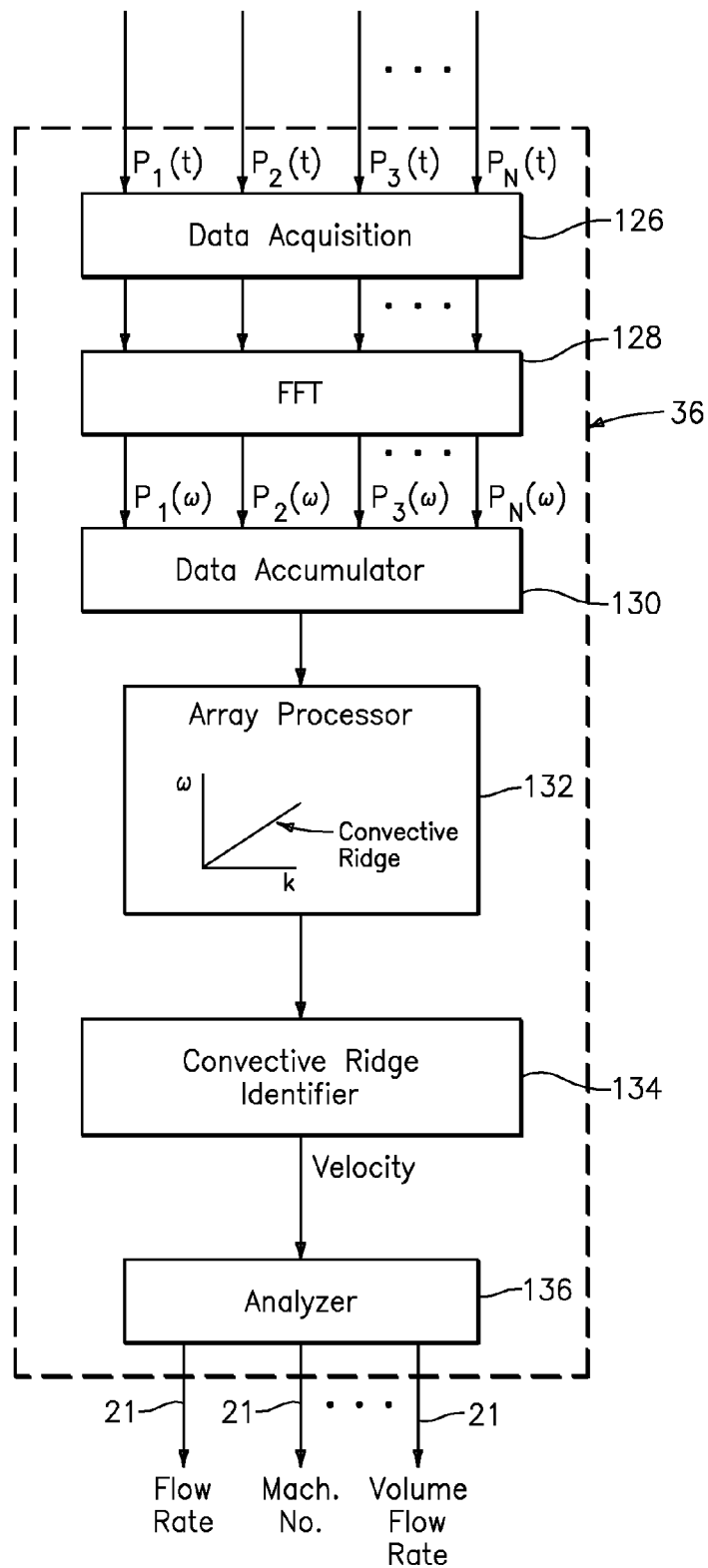
FIG. 8 is a block diagram of a first embodiment of a flow logic used in the apparatus of the present invention.
Figure 9:
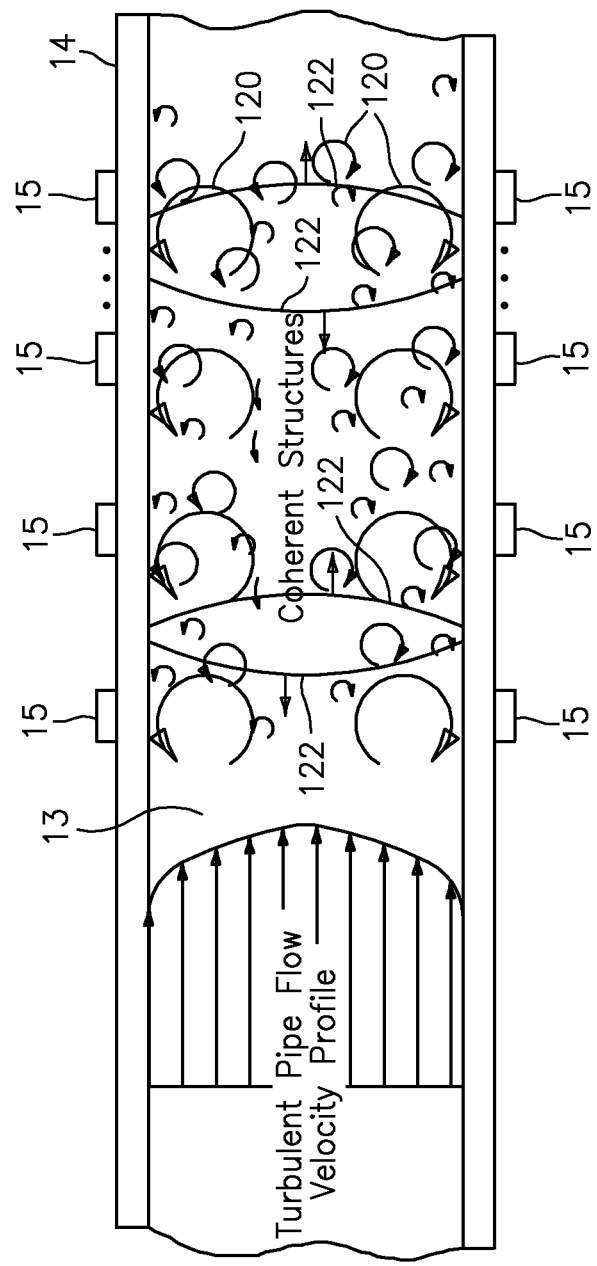
FIG. 9 is a cross-sectional view of a pipe having coherent structures therein.

Referring to FIG. 8, an example of flow logic 36 is shown. As previously described, the array 11 of at least two sensors 15 located at two locations, for example, axially at $x_1$, $x_2$ or circumferentially, along the pipe 14 sense respective stochastic signals propagating between the sensors 15 within the pipe 14 at their respective locations. Each sensor 15 provides a signal indicating an unsteady pressure at the location of each sensor 15, at each instant in a series of sampling instants. One will appreciate that the array 11 may include more than two sensors 15 distributed at differing locations, axially at $x_1$, $x_2, \ldots x_N$ or circumferentially at $\theta_1, \theta_2, \ldots, \theta_N$. The pressure generated by the convective pressure disturbances (e.g., eddies 120, see FIG. 9) may be measured through strained-based sensors 15 and/or pressure sensors. The sensors 15 provide analog pressure time-varying signals $P_1(t)$, $P_2(t)$, $P_3(t), \ldots, P_N(t)$ to the signal processor 19, which in turn applies selected ones of these signals $P_1(t)$, $P_2(t)$, $P_3(t), \ldots, P_N(t)$ to the flow logic 36.

The flow logic 36 processes the selected signals $P_1(t)$, $P_2(t)$, $P_3(t), \ldots, P_N(t)$ to first provide output signals (parameters) 21 indicative of the pressure disturbances that convect with the fluid (process flow) 13, and subsequently, provide output signals (parameters) 21 in response to pressure disturbances generated by convective waves propagating through the fluid 13, such as velocity, Mach number, flow rate, and volumetric flow rate of the process flow 13.

The signal processor 19 includes data acquisition unit 126 (e.g., A/D converter) that converts the analog signals $P_1(t)$, $P_2(t), \ldots, P_N(t)$ to respective digital signals and provides selected ones of the digital signals $P_1(t) \ldots P_N(t)$ to FFT logic 128. The FFT logic 128 calculates the Fourier transform of the digitized time-based input signals $P_1(t) \ldots P_N(t)$ and provides complex frequency domain (or frequency based) signals $P_1(\omega)$, $P_2(\omega)$, $P_3(\omega), \ldots, P_N(\omega)$ indicative of the frequency content of the input signals. Instead of FFT's, any other technique for obtaining the frequency domain characteristics of the signals $P_1(t)$-$P_N(t)$, may be used. For example, the cross-spectral density and the power spectral density may be used to form a frequency domain transfer functions (or frequency response or ratios) discussed hereinafter.

One technique of determining the convection velocity of the turbulent eddies 120 within the process flow 13 is by characterizing a convective ridge of the resulting unsteady pressures using an array of sensors or other beam forming techniques, similar to that described in U.S. patent application Ser. No. and U.S. patent application Ser. No. 09/729,994, filed Dec. 4, 200, now U.S. Pat. No. 6,609,069, which are incorporated herein by reference. A data accumulator 130 accumulates the frequency signals $P_1(\omega)$-$P_N(\omega)$ over a sampling interval, and provides the data to an array processor 132, which performs a spatial-temporal (two-dimensional) transform of the sensor data, from the xt domain to the k-$\omega$ domain, and then calculates the power in the k-$\omega$ plane, as represented by a k-$\omega$ plot.

The array processor 132 uses conventional beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$, where $\lambda$ is the wavelength of a spectral component, and corresponding angular frequencies given by $\omega=2\pi\nu$.

The prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensor units apart from each other and yet still be within the coherence length.

Convective characteristics or parameters have a dispersion relationship that can be approximated by the straight-line equation, $$k=\omega/u,$$

where u is the convection velocity (flow velocity). A plot of k-$\omega$ pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. What is being sensed are not discrete events of turbulent eddies, but rather a continuum of possibly overlapping events forming a temporally stationary, essentially white process over the frequency range of interest. In other words, the convective eddies 120 is distributed over a range of length scales and hence temporal frequencies.

To calculate the power in the k-$\omega$ plane, as represented by a k-$\omega$ plot (see FIG. 10) of either the signals, the array processor 132 determines the wavelength and so the (spatial) wave number k, and also the (temporal) frequency and so the angular frequency $\omega$, of various of the spectral components of the stochastic parameter. There are numerous algorithms available in the public domain to perform the spatial/temporal decomposition of arrays of sensors 15.

The present invention may use temporal and spatial filtering to precondition the signals to effectively filter out the common mode characteristics $P_{common\ mode}$ and other long wavelength (compared to the sensor spacing) characteristics in the pipe 14 by differencing adjacent sensors 15 and retain a substantial portion of the stochastic parameter associated with the flow field and any other short wavelength (compared to the sensor spacing) low frequency stochastic parameters.

Figure 10:
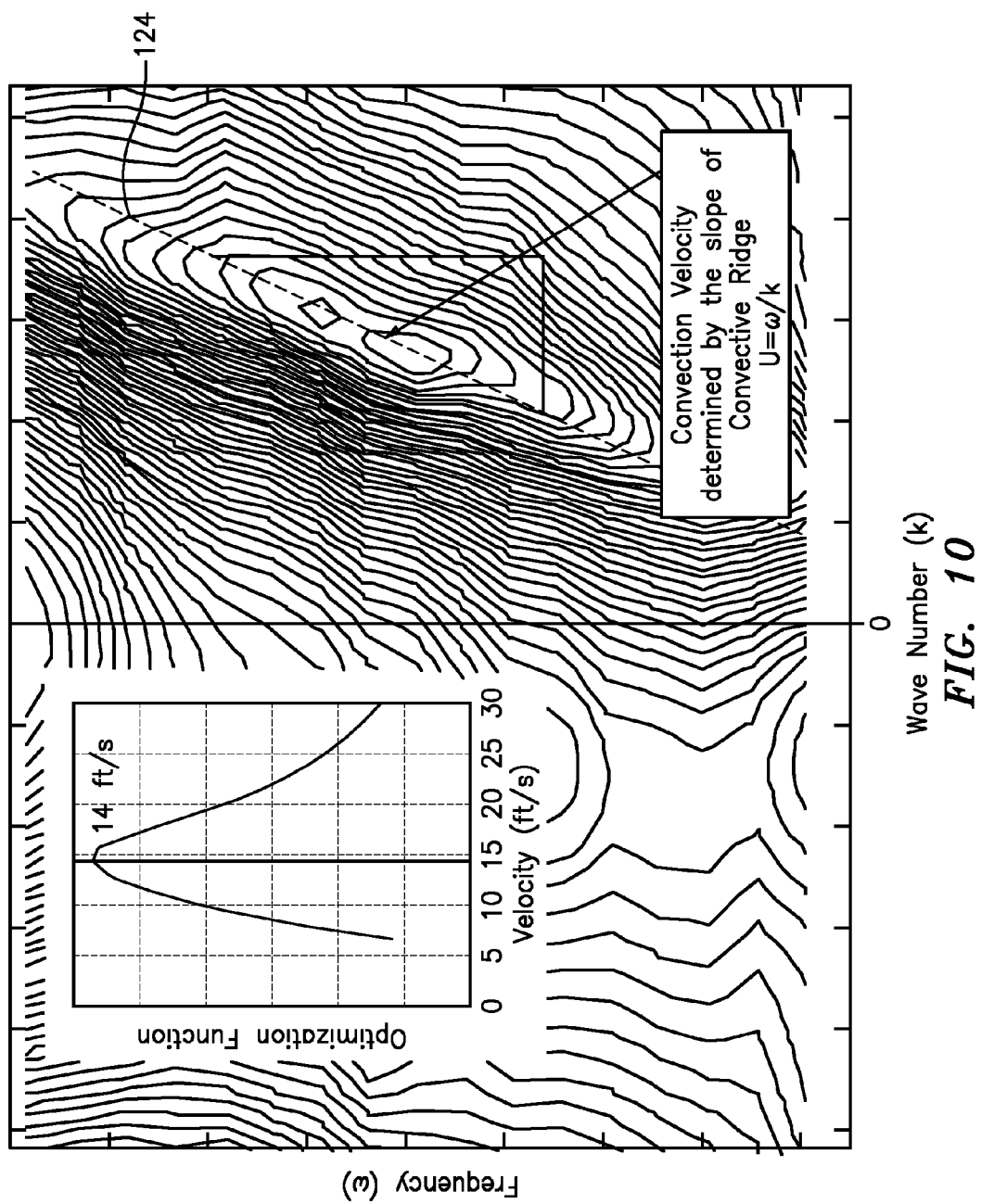
FIG. 10 a k$\omega$ plot of data processed from an apparatus embodying the present invention that illustrates slope of the convective ridge, and a plot of the optimization function of the convective ridge.

In the case of suitable turbulent eddies 120 (see FIG. 9) being present, the power in the k-$\omega$ plane shown in a k-$\omega$ plot of FIG. 10 shows a convective ridge 124. The convective ridge represents the concentration of a stochastic parameter that convects with the flow and is a mathematical manifestation of the relationship between the spatial variations and temporal variations described above. Such a plot will indicate a tendency for k-$\omega$ pairs to appear more or less along a line 124 with some slope, the slope indicating the flow velocity.

Once the power in the k-$\omega$ plane is determined, a convective ridge identifier 134 uses one or another feature extraction method to determine the location and orientation (slope) of any convective ridge 124 present in the k-$\omega$ plane. In one embodiment, a slant stacking method is used. The slant stacking method provides that the accumulated frequency of k-$\omega$ pairs in the k-$\omega$ plot along different rays emanating from the origin are compared, each different ray being associated with a different trial convection velocity (in that the slope of a ray is assumed to be the flow velocity or correlated to the flow velocity in a known way). The convective ridge identifier 134 provides information about the different trial convection velocities, information referred to generally as convective ridge information.

The analyzer 136 examines the convective ridge information including the convective ridge orientation (slope). Assuming the straight-line dispersion relation given by $k=\omega/u$, the analyzer 136 determines the flow velocity, Mach number and/or volumetric flow, which are output as parameters 21. The volumetric flow is determined by multiplying the cross-sectional area of the inside of the pipe with the velocity of the process flow.

Some or all of the functions within the flow logic 36 may be implemented in software (using a microprocessor or computer) and/or firmware, or may be implemented using analog and/or digital hardware, having sufficient memory, interfaces, and capacity to perform the functions described herein.

Speed of Sound (SOS) Processing

Figure 11:
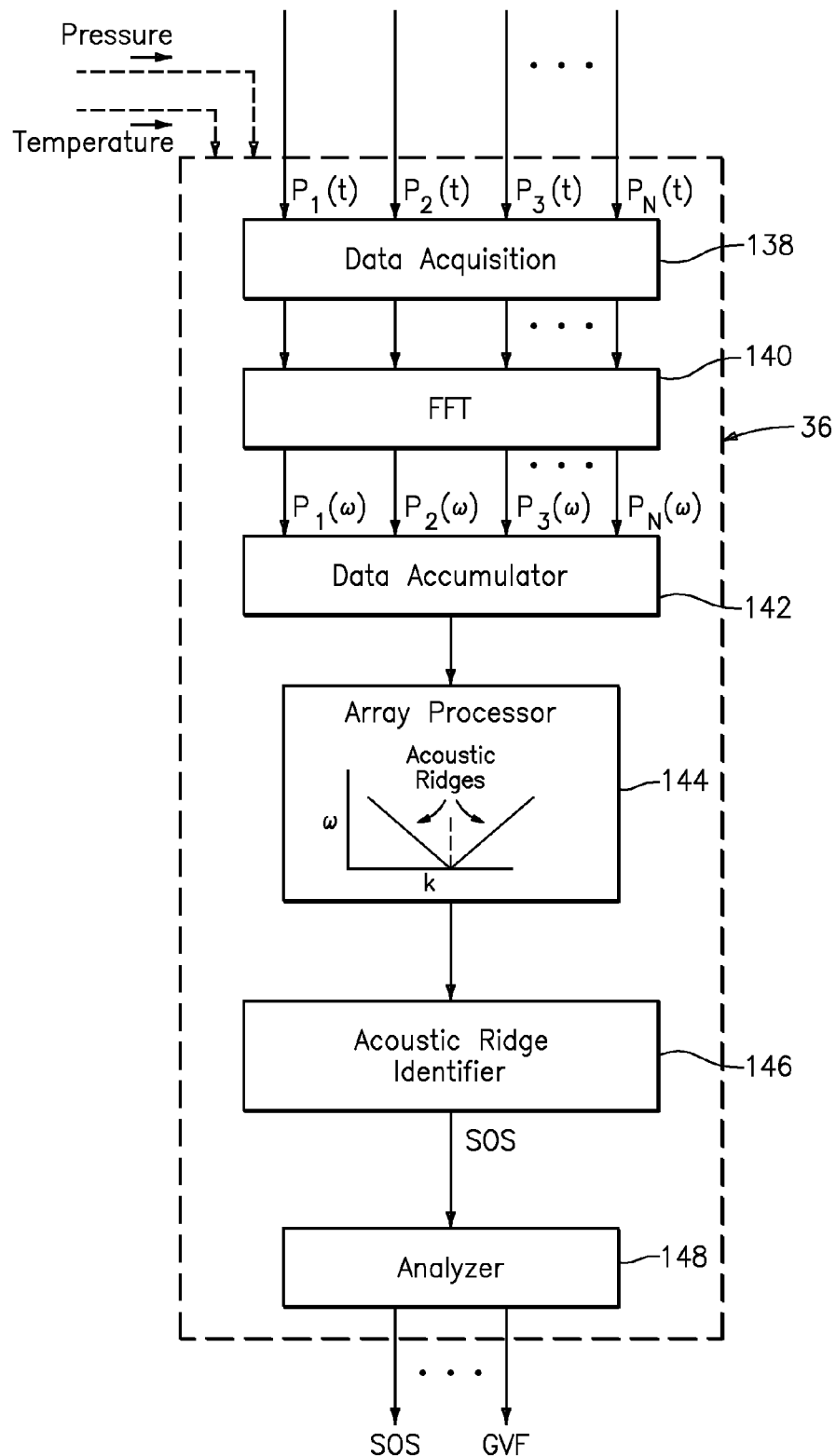
FIG. 11 is a block diagram of a second embodiment of a flow logic used in the apparatus of the present invention.

Referring to FIG. 11, another example of flow logic 36 is shown. While the examples of FIG. 8 and FIG. 11 are shown separately, it is contemplated that the flow logic 36 may perform all of the functions described with reference to FIG. 8 and FIG. 11. As previously described, the array 11 of at least two sensors 15 located on at least two locations, e.g., axially at locations $x_1$, $x_2$ along or circumferentially at locations $\theta_1$, $\theta_2$, ..., $\theta_N$, about the pipe 14, sense respective stochastic signals propagating between the sensors within the pipe 14 at their respective locations. Each sensor 15 provides a signal indicating an unsteady pressure at the location of the sensor 15, at each instant in a series of sampling instants. One will appreciate that the sensor array 11 may include more than two strain-based sensors 15 distributed at the locations along (axial locations $x_1$ ... $x_N$) and about (circumferential locations $\theta_1$, $\theta_2$, ..., $\theta_N$) the pipe 14. The pressure generated by the acoustic pressure disturbances (e.g., acoustic waves 122, see FIG. 9) may be measured through strained-based sensors and/or pressure sensors. The sensors 15 provide analog pressure time-varying signals $P_1(t)$, $P_2(t)$, $P_3(t)$, ... $P_N(t)$ to the flow logic 36. The flow logic 36 processes the signals $P_1(t)$, $P_2(t)$, $P_3(t)$, ... $P_N(t)$ from selected ones of the sensors 15 to first provide output signals indicative of the speed of sound (SOS) propagating through the fluid (process flow) 13, and subsequently, provide output signals in response to pressure disturbances generated by acoustic waves propagating through the process flow 13, such as velocity, Mach number, flow rate and volumetric flow rate of the process flow 13.

The signal processor 19 receives the pressure signals from the array 11 of sensors 15. A data acquisition unit 138 digitizes selected ones of the pressure signals $P_1(t)$ ... $P_N(t)$ associated with the acoustic waves 122 propagating through the pipe 14. Similarly to the FFT logic 128 of FIG. 8, an FFT logic 140 calculates the Fourier transform of the selected digitized time-based input signals $P_1(t)$ ... $P_N(t)$ and provides complex frequency domain (or frequency based) signals $P_1(\omega)$, $P_2(\omega)$, $P_3(\omega)$, ... $P_N(\omega)$ indicative of the frequency content of the input signals.

A data accumulator 142 accumulates the frequency signals $P_1(\omega)$ ... $P_N(\omega)$ over a sampling interval, and provides the data to an array processor 144, which performs a spatial-temporal (two-dimensional) transform of the sensor data, from the xt domain to the k-ω domain, and then calculates the power in the k-ω plane, as represented by a k-ω plot.

To calculate the power in the k-ω plane, as represented by a k-ω plot (see FIG. 12) of either the signals or the differenced signals, the array processor 144 determines the wavelength and so the (spatial) wave number k, and also the (temporal) frequency and so the angular frequency ω, of various of the spectral components of the stochastic parameter. There are numerous algorithms available in the public domain to perform the spatial/temporal decomposition of arrays of sensor units 15.

Figure 12:
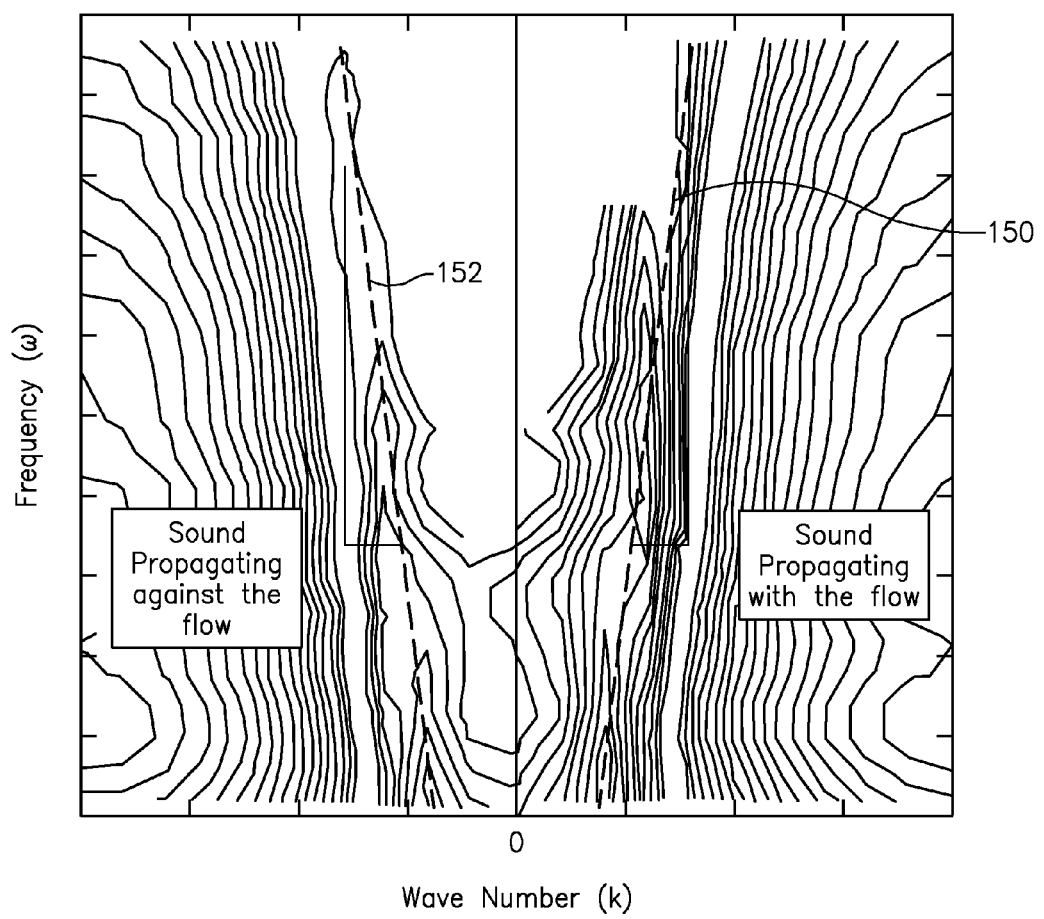
FIG. 12 a k-$\omega$ plot of data processed from an apparatus embodying the present invention that illustrates slope of the acoustic ridges.

In the case of suitable acoustic waves 122 being present in both axial directions, the power in the k-ω plane shown in a k-ω plot of FIG. 12 so determined will exhibit a structure that is called an acoustic ridge 150, 152 in both the left and right planes of the plot, wherein one of the acoustic ridges 150 is indicative of the speed of sound traveling in one axial direction (e.g., with the fluid flow) and the other acoustic ridge 152 being indicative of the speed of sound traveling in the other axial direction (e.g., against the fluid flow). The acoustic ridges represent the concentration of a stochastic parameter that propagates through the flow and is a mathematical manifestation of the relationship between the spatial variations and temporal variations described above. Such a plot will indicate a tendency for k-ω pairs to appear more or less along a line 150, 152 with some slope, the slope indicating the speed of sound.

The power in the k-ω plane so determined is then provided to an acoustic ridge identifier 146, which uses one or another feature extraction method to determine the location and orientation (slope) of any acoustic ridge present in the left and right k-ω plane. The velocity may be determined by using the slope of one of the two acoustic ridges 150, 152 or averaging the slopes of the acoustic ridges 150, 152.

Finally, information including the acoustic ridge orientation (slope) is used by an analyzer 148 to determine the flow parameters relating to measured speed of sound, such as the consistency or composition of the flow, the density of the flow, the average size of particles in the flow, the air/mass ratio of the flow, gas volume fraction of the flow, the speed of sound propagating through the flow, and/or the percentage of entrained air within the flow.

Similar to the array processor 132 of FIG. 8, the array processor 144 uses known beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$, where $\lambda$ is the wavelength of a spectral component, and corresponding angular frequencies given by $\omega=2\pi\nu$.

One such technique of determining the speed of sound propagating through the process flow 13 is using array processing techniques to define an acoustic ridge in the k-ω plane as shown in FIG. 12. The slope of the acoustic ridge is indicative of the speed of sound propagating through the process flow 13. The speed of sound (SOS) is determined by applying sonar arraying processing techniques to determine the speed at which the one dimensional acoustic waves propagate past the axial array of unsteady pressure measurements distributed along the pipe 14.

The flow logic 36 of the present embodiment measures the speed of sound (SOS) of one-dimensional sound waves propagating through the process flow 13 to determine the gas volume fraction of the process flow 13. It is known that sound propagates through various mediums at various speeds in such fields as SONAR and RADAR fields. The speed of sound propagating through the pipe 14 and process flow 13 may be determined using a number of known techniques, such as those set forth in U.S. patent application Ser. No. 09/344,094, filed Jun. 25, 1999, now U.S. Pat. No. 6,354,147; U.S. patent application Ser. No. 10/795,111, filed Mar. 4, 2004; U.S. patent application Ser. No. 09/997,221, filed Nov. 28, 2001, now U.S. Pat. No. 6,587,798; U.S. patent application Ser. No. 10/007,749, filed Nov. 7, 2001, and U.S. patent application Ser. No. 10/762,410, filed Jan. 21, 2004, each of which U.S. patent documents are incorporated by reference herein in their entireties.

While the sonar-based flow meter using an array of sensors 15 to measure the speed of sound of an acoustic wave propagating through the mixture is shown and described, one will appreciate that any means for measuring the speed of sound of the acoustic wave may used to determine the entrained gas volume fraction of the mixture/fluid or other characteristics of the flow described hereinbefore.

The analyzer 148 of the flow logic 36 provides output parameters 21 indicative of characteristics of the process flow 13 that are related to the measured speed of sound (SOS) propagating through the process flow 13. For example, to determine the gas volume fraction (or phase fraction), the analyzer 148 assumes a nearly isothermal condition for the process flow 13. As such the gas volume fraction or the void fraction is related to the speed of sound by the following quadratic equation:

$$Ax^2+Bx+C=0$$

wherein x is the speed of sound, $A=1+rg/rl*(K_{eff}/P-1)-K_{eff}/P$, $B=K_{eff}/P-2+rg/rl$; $C=1-K_{eff}/rl*a_{meas}\hat{}2)$; Rg=gas density, rl=liquid density, $K_{eff}$=effective K (modulus of the liquid and pipewall), P=pressure, and $a_{meas}$=measured speed of sound.

Effectively, $$\text{Gas Volume Fraction(GVF)}=(-B+\text{sqrt}(B\hat{}2-4*A*C))/(2*A)$$

Alternatively, the sound speed of a mixture can be related to volumetric phase fraction ($\phi_i$) of the components and the sound speed (a) and densities ($\rho$) of the component through the Wood equation.

$$\frac{1}{\rho_{mix} a_{mix\infty}^2} = \sum_{i=1}^{N} \frac{\phi_i}{\rho_i a_i^2}$$

where $$\rho_{mix} = \sum_{i=1}^{N} \rho_i \phi_i$$

One dimensional compression waves propagating within a process flow 13 contained within a pipe 14 exert an unsteady internal pressure loading on the pipe. The degree to which the pipe displaces as a result of the unsteady pressure loading influences the speed of propagation of the compression wave. The relationship among the infinite domain speed of sound and density of a mixture; the elastic modulus (E), thickness (t), and radius (R) of a vacuum-backed cylindrical conduit; and the effective propagation velocity ($a_{eff}$) for one dimensional compression is given by the following expression:

$$a_{eff} = \frac{1}{\sqrt{\frac{1}{a_{mix\infty}^2} + \rho_{mix}\frac{2R}{Et}}} \quad (eq\ 1)$$

Figure 13:
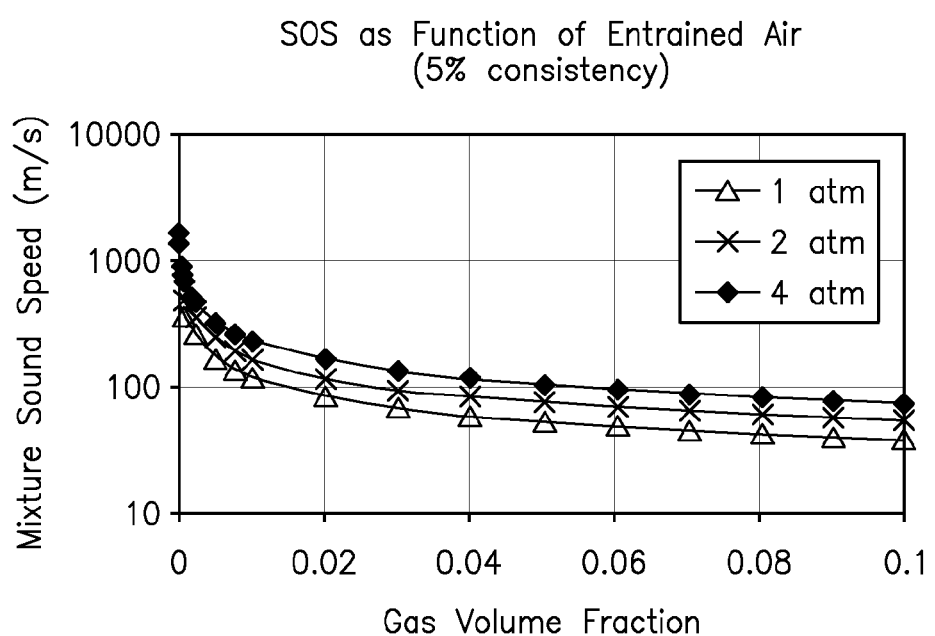
FIG. 13 is a plot of mixture sound speed as a function of gas volume fraction for a 5% consistency slurry over a range of process pressures.

The mixing rule essentially states that the compressibility of a process flow ($1/(\rho a^2)$) is the volumetrically-weighted average of the compressibilities of the components. For a process flow 13 consisting of a gas/liquid mixture at pressure and temperatures typical of paper and pulp industry, the compressibility of gas phase is orders of magnitudes greater than that of the liquid. Thus, the compressibility of the gas phase and the density of the liquid phase primarily determine mixture sound speed, and as such, it is necessary to have a good estimate of process pressure to interpret mixture sound speed in terms of volumetric fraction of entrained gas. The effect of process pressure on the relationship between sound speed and entrained air volume fraction is shown in FIG. 13.

As described hereinbefore, the flow logic 36 of the present embodiment includes the ability to accurately determine the average particle size of a particle/air or droplet/air mixture within the pipe 14 and the air to particle ratio. Provided there is no appreciable slip between the air and the solid coal particle, the propagation of one dimensional sound wave through multiphase mixtures is influenced by the effective mass and the effective compressibility of the mixture. For an air transport system, the degree to which the no-slip assumption applies is a strong function of particle size and frequency. In the limit of small particles and low frequency, the no-slip assumption is valid. As the size of the particles increases and the frequency of the sound waves increase, the non-slip assumption becomes increasing less valid. For a given average particle size, the increase in slip with frequency causes dispersion, or, in other words, the sound speed of the mixture to change with frequency. With appropriate calibration the dispersive characteristic of a process flow 13 will provide a measurement of the average particle size, as well as, the air to particle ratio (particle/fluid ratio) of the process flow 13.

In accordance with the present invention the dispersive nature of the system utilizes a first principles model of the interaction between the air and particles. This model is viewed as being representative of a class of models that seek to account for dispersive effects. Other models could be used to account for dispersive effects without altering the intent of this disclosure (for example, see the paper titled "Viscous Attenuation of Acoustic Waves in Suspensions" by R. L. Gibson, Jr. and M. N. Toksöz), which is incorporated herein by reference. The model allows for slip between the local velocity of the continuous fluid phase and that of the particles.

The following relation can be derived for the dispersive behavior of an idealized fluid particle mixture.

$$a_{mix}(\omega) = a_f \sqrt{\frac{1}{1+\frac{\varphi_p \rho_p}{\rho_f\left(1+\omega^2 \frac{\rho_p^2 v_p^2}{K^2}\right)}}}$$

In the above relation, the fluid SOS, density ($\rho$) and viscosity ($\phi$) are those of the pure phase fluid, $v_p$ is the volume of individual particles and $\phi_p$ is the volumetric phase fraction of the particles in the mixture.

Figure 14:
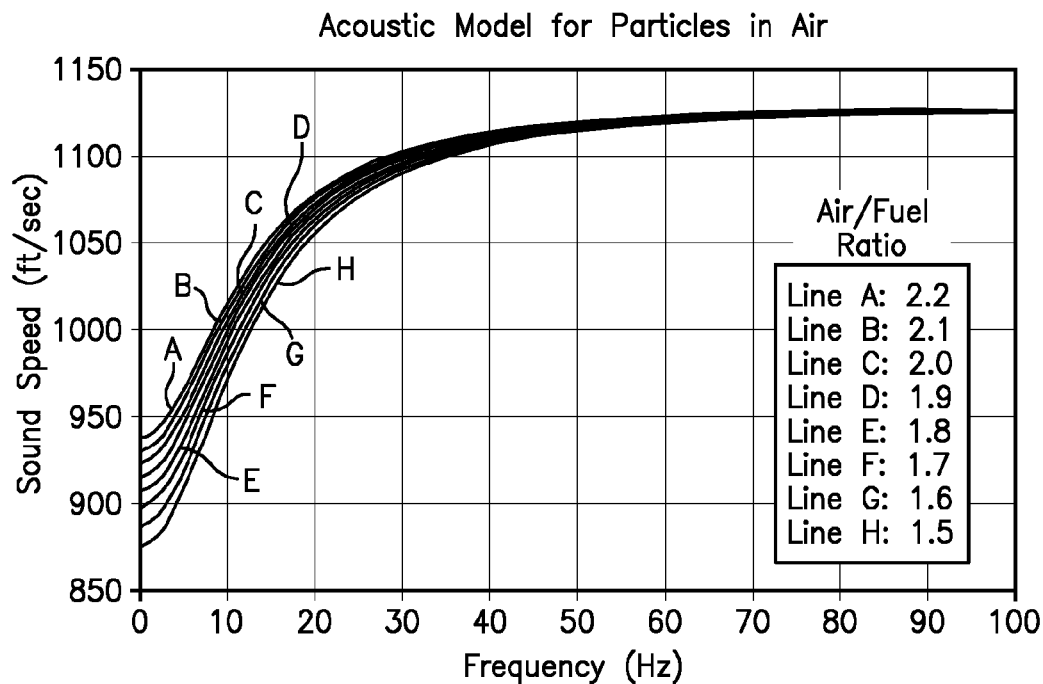
FIG. 14 is a plot of sound speed as a function of frequency for air/particle mixtures with fixed particle size and varying air-to-particle mass ratio.
Figure 15:
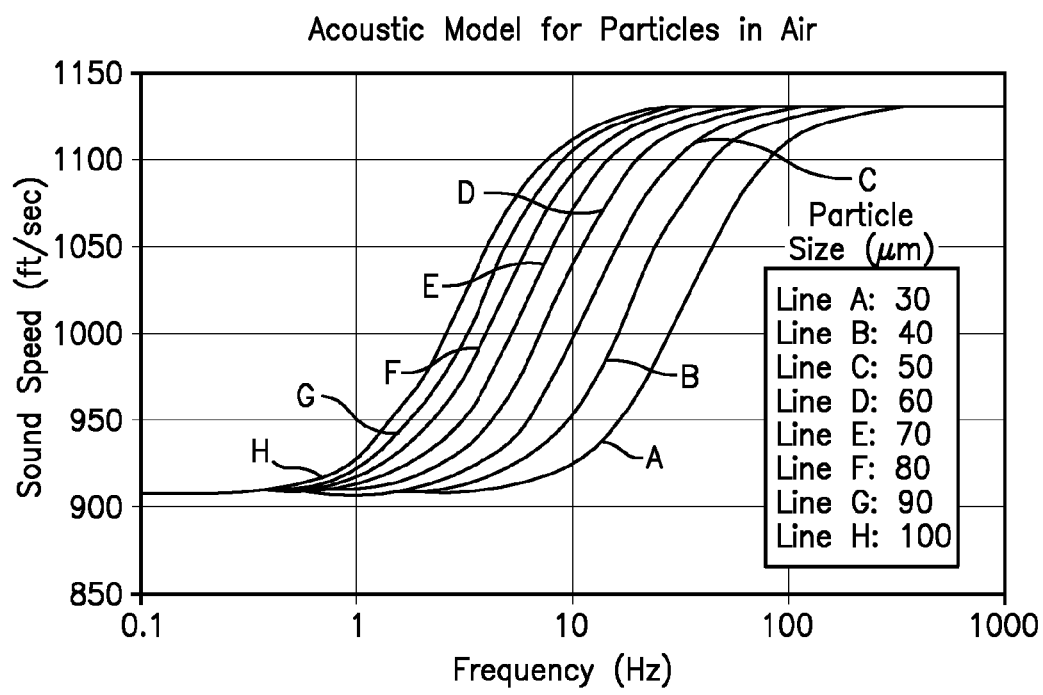
FIG. 15 is a plot of sound speed as a function of frequency for air/particle mixtures with varying particle size where the air-to-particle mass ratio is fixed.

Two parameters of particular interest in steam processes and air-conveyed particles processes are particle size and air-to-fuel mass ratio or steam quality. To this end, it is of interest to examine the dispersive characteristics of the mixture as a function of these two variables. FIG. 14 and FIG. 15 show the dispersive behavior in relations to the speed of sound for coal/air mixtures with parameters typical of those used in pulverized coal deliver systems.

In particular FIG. 14 shows the predicted behavior for nominally 50 μm size coal in air for a range of air-to-fuel ratios. As shown, the effect of air-to-fuel ratio is well defined in the low frequency limit. However, the effect of the air-to-fuel ratio becomes indistinguishable at higher frequencies, approaching the sound speed of the pure air at high frequencies (above ~100 Hz).

Similarly, FIG. 15 shows the predicted behavior for a coal/air mixture with an air-to-fuel ratio of 1.8 with varying particle size. This figure illustrates that particle size has no influence on either the low frequency limit (quasi-steady) sound speed, or on the high frequency limit of the sound speed. However, particle size does have a pronounced effect in the transition region.

FIG. 14 and FIG. 15 illustrate an important aspect of the present invention, namely, that the dispersive properties of dilute mixtures of particles suspended in a continuous liquid can be broadly classified into three frequency regimes: low frequency range, high frequency range and a transitional frequency range. Although the effect of particle size and air-to-fuel ratio are inter-related, the predominant effect of air-to-fuel ratio is to determine the low frequency limit of the sound speed to be measured and the predominate effect of particle size is to determine the frequency range of the transitional regions. The inventors have discovered that as particle size increases, the frequency at which the dispersive properties appear decreases. For typical pulverized coal applications, this transitional region begins at fairly low frequencies, ~2 Hz for 50 µm size particles.

Given the difficulties measuring sufficiently low frequencies to apply the quasi-steady model and recognizing that the high frequency sound speed contains no direct information on either particle size or air-to-fuel ratio, it becomes apparent that the dispersive characteristics of the coal/air mixture should be utilized to determine particle size and air-to-fuel ratio based on speed of sound measurements.

Some or all of the functions within the flow logic 36 may be implemented in software (using a microprocessor or computer) and/or firmware, or may be implemented using analog and/or digital hardware, having sufficient memory, interfaces, and capacity to perform the functions described herein.

While FIG. 8 and FIG. 11 depict two different embodiments of the flow logic 36 to measure various parameters of the flow process, the present invention contemplates that the functions of these two embodiments may be performed by a single flow logic 36.

As described herein, the apparatus of the present invention provides a configurable array of sensors for use in determining at least one parameter associated with a fluid. By using a sheet of PVDF having a plurality of sensors disposed thereon, a large number of sensors, and thus a highly configurable array, can be manufactured and installed both quickly and economically.

With the present invention, system reliability is increased because redundant sensors can be created. For example, if a fault is seen on one sensor, another can be activated to replace it. In addition, latent functionality can be created because, with the present invention, the array can be reconfigured to meet the needs of new features without requiring a new set of sensors to be installed. The present invention also allows the array to be configured differently for measuring different parameters or for optimizing measurement of a given parameter. The present invention permits a non-linear aperture by varying the spacing between consecutive sensors in the array. This can be adjusted in real-time to allow for spatial filtering of the signals to overcome conditions (e.g., vibrations) that may otherwise prevent or inhibit the sensing of unsteady pressures within the fluid.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. An apparatus for measuring a parameter of a flow passing through a pipe, the apparatus comprising:
a signal processor configured to:
receive selected pressure signals containing information about a selected configurable array of sensors having each sensor disposed at a different axial and circumferential location along the pipe, each of the sensors providing a respective pressure signal indicative of pressure within the pipe at a corresponding axial and circumferential location of the pipe, the selected pressure signals being received from selected ones of axial and circumferential sensors in the selected configurable array based at least partly on a selected axial and circumferential sensor configuration of the selected configurable two-dimensional array of sensors that depends on a parameter of flow passing through the pipe to be determined; and
determine the parameter of flow passing through pipe using an array processing algorithm, based at least partly on the selected pressure signals received.

2. The apparatus of claim 1, wherein the signal processor is configured to determine at least one parameter selected from a group that includes: density of the flow, volumetric flow rate of the flow, mass flow rate of the flow, composition of the flow, entrained air in the flow, consistency of the flow, size of particles in the flow, and health of a device causing unsteady pressures in the pipe.

3. The apparatus of claim 1, wherein the signal processor is configured to select the selected pressure signals from the selected configurable two-dimensional array of sensors based at least partly on the parameter of the flow to be output by the signal processor.

4. The apparatus of claim 1, wherein the signal processor is configured to select the parameter of the flow to be determined in response to an input signal received by the signal processor.

5. The apparatus of claim 1, wherein the selected pressure signals from the selected configurable two-dimensional array of sensors are predetermined for the parameter of the flow.

6. The apparatus of claim 1, wherein the selected pressure signals from the selected configurable two-dimensional array of sensors are based at least partly on a previously determined parameter of the flow.

7. The apparatus of claim 6, wherein the previously determined parameter of the flow includes at least one of: density of the flow, volumetric flow rate of the flow, mass flow rate of the flow, composition of the flow, entrained air in the flow, consistency of the flow, size of particles in the flow, and health of a device causing unsteady pressures to be generated in the pipe.

8. The apparatus of claim 1, wherein the signal processor is configured to receive an input signal containing information about the selected axial and circumferential sensor configuration of the selected configurable two-dimensional array of sensors.

9. The apparatus of claim 1, wherein the selected pressure signals from the selected configurable two-dimensional array of sensors are dependent on an indication of a faulty sensor.

10. The apparatus of claim 1, wherein the selected pressure signals from the selected configurable two-dimensional array of sensors are dependent on a condition associated with the pipe.

11. The apparatus of claim 10, wherein the condition associated with the pipe is a vibration of the pipe, and the signal processor is configured to select the selected pressure signals such that the selected pressure signals are received from selected pressure signals substantially positioned at or near a respective node associated with the vibration of the pipe.

12. The apparatus of claim 1, wherein the selected pressure signals contain information about the selected configurable two-dimensional array of sensors formed on a single sheet of piezoelectric film material wrapped around at least a portion of an outer surface of the pipe.

13. The apparatus of claim 12, wherein the selected pressure signals contain information about each of the sensors, including: a first electrode disposed on a first side of the sheet of piezoelectric film material, and a second electrode disposed on a second side of the sheet of piezoelectric film material opposite the first electrode.

14. The apparatus of claim 13, wherein each of the first and second electrodes are formed as an elongated strip of conductive material.

15. The apparatus of claim 14, wherein the first and second electrodes extend around at least a portion of the outer surface of the pipe and substantially parallel to adjacent first and second electrodes.

16. The apparatus of claim 15, wherein the elongated strip of conductive material is formed from silver ink applied to the sheet of piezoelectric film material.

17. The apparatus of claim 13, wherein the sheet of piezoelectric film material and the first and second electrodes are disposed between layers of a non-conductive material.

18. The apparatus of claim 13, wherein the selected configurable two-dimensional array of sensors comprises a connector connected to each of the sensors, and the signal processor is configured to couple electrically to the connector.

19. The apparatus of claim 13, wherein each of the sensors further comprises: a plurality of electrically connected first electrodes disposed on the first side of the sheet of piezoelectric film material, and a plurality of electrically connected second electrodes disposed on the second side of the sheet of piezoelectric film material opposite the plurality of first electrodes.

20. The apparatus of claim 1, wherein the selected pressure signals contain information about a number of sensors in the selected configurable two-dimensional array of sensors that is equal to one of: 3, 4, 5, 6, 7, 8, 9, 10, 11, 12, 13, 14, 15, 16, 17, 18, 19, 20, 21, 22, 23, and 24.

21. The apparatus of claim 1, wherein the selected pressure signals contain information about the sensors that are selected from one or more of: pressure sensors, electrical strain gages, optical fibers and/or gratings, ported sensors, and ultrasonic sensors.

22. The apparatus of claim 1, wherein the selected pressure signals contain information about an unsteady pressure within the pipe at the corresponding axial and circumferential location of the pipe.

23. A method of measuring a parameter of a flow passing through a pipe, the method comprising:
receiving in a signal processor selected pressure signals containing information about a selected configurable two-dimensional array of sensors having each sensor disposed at a different axial and circumferential location along the pipe, each of the sensors providing a respective pressure signal indicative of pressure within the pipe at a corresponding axial and circumferential location of the pipe, the selected pressure signals being received from selected ones of axial and circumferential sensors in the selected configurable two-dimensional array based at least partly on a selected axial and circumferential sensor configuration of the selected configurable two-dimensional array of sensors that depends on a parameter of flow passing through the pipe to be determined; and
determining with the signal processor the parameter of flow passing through the pipe using an array processing algorithm, based at least partly on the selected pressure signals received.

24. The method of claim 23, wherein the method further comprises determining with the signal processor at least one parameter selected from a group that includes: density of the flow, volumetric flow rate of the flow, mass flow rate of the flow, composition of the flow, entrained air in the flow, consistency of the flow, size of particles in the flow, and health of a device causing unsteady pressures in the pipe.

25. The method of claim 23, wherein the method further comprises selecting the selected pressure signals from the selected configurable two-dimensional array of sensors based at least partly on the parameter of the flow to be determined by the signal processor.

26. The method of claim 22, wherein the method further comprises selecting the parameter of the flow to be determined in response to an input signal received by the signal processor.

27. The method of claim 23, wherein the method further comprises using predetermining selected pressure signals from the selected configurable two-dimensional array of sensors for the parameter of the flow.

28. The method of claim 23, wherein the method further comprises selecting the selected pressure signals from the selected configurable two-dimensional array of sensors based at least partly on a previously determined parameter of the flow.

29. The method of claim 28, wherein the previously determined parameter of the flow includes at least one of: density of the flow, volumetric flow rate of the flow, mass flow rate of the flow, composition of the flow, entrained air in the flow, consistency of the flow, size of particles in the flow, and health of a device causing unsteady pressures to be generated the pressures in the pipe.

30. The method of claim 23, wherein the method further comprises receiving in the signal processor an input signal containing information about the selected axial and circumferential sensor configuration of the selected configurable two-dimensional array of sensors.

31. The method of claim 23, wherein the method comprises selecting the selected pressure signals from the selected configurable two-dimensional array of sensors based on an indication of a faulty sensor.

32. The method of claim 23, wherein the method comprises selecting the selected pressure signals from the selected configurable two-dimensional array of sensors based on a condition associated with the pipe.

33. The method of claim 32, wherein the condition associated with the pipe is a vibration of the pipe, and the method further comprises selecting the selected pressure signals such that the selected pressure signals are received from selected pressure sensors substantially positioned at or near a respective node associated with the vibration of the pipe.

34. The method of claim 23, wherein the selected pressure signals contain information about the selected configurable two-dimensional array of sensors formed on a single sheet of piezoelectric film material wrapped around at least a portion of an outer surface of the pipe.

35. The method of claim 34, wherein the selected pressure signals contain information about each of the sensors, including a first electrode disposed on a first side of the sheet of piezoelectric film material, and a second electrode disposed on a second side of the sheet of piezoelectric film material opposite the first electrode.

36. The method of claim 35, wherein each of the first and second electrodes are formed as an elongated strip of conductive material.

37. The method of claim 36, wherein the first and second electrodes extend around at least a portion of the outer surface of the pipe and substantially parallel to adjacent first and second electrodes.

38. The method of claim 37, wherein the elongated strip of conductive material is formed from silver ink applied to the sheet of piezoelectric film material.

39. The method of claim 35, wherein the sheet of piezoelectric film material and the first and second electrodes are disposed between layers of a non-conductive material.

40. The method of claim 34, wherein the selected configurable two-dimensional array of sensors comprises a connector connected to each of the pressure sensors, and the method comprises coupling electrically the signal processor to the connector.

41. The method of claim 34, wherein each of the sensors further comprises: a plurality of electrically connected first electrodes disposed on the first side of the sheet of piezoelectric film material, and a plurality of electrically connected second electrodes disposed on the second side of the sheet of piezoelectric film material opposite the plurality of first electrodes.

42. The method of claim 23, wherein the selected pressure signals contain information about a number of pressure sensors in the selected configurable two-dimensional array of sensors that is equal to one of: 3, 4, 5, 6, 7, 8, 9, 10, 11, 12, 13, 14, 15, 16, 17, 18, 19, 20, 21, 22, 23, and 24.

43. The method of claim 23, wherein the method further comprises selecting the sensors from one or more of: pressure sensors, electrical strain gages, optical fibers and/or gratings, ported sensors, and ultrasonic sensors.

44. The method of claim 23, wherein the pressure within the pipe at the corresponding axial and circumferential location of the pipe is an unsteady pressure.

45. Apparatus for measuring a parameter of a flow passing through a pipe, comprising:
    means for receiving in a signal processor selected pressure signals containing information about a selected configurable two-dimensional array of sensors having each sensor disposed at a different axial and circumferential location along the pipe, each of the sensors providing a respective pressure signal indicative of pressure within the pipe at a corresponding axial and circumferential location of the pipe, the selected pressure signals being received from selected ones of axial and circumferential sensors in the selected configurable two-dimensional array based at least partly on a selected axial and circumferential sensor configuration of the selected configurable two-dimensional array of sensors that depends on a parameter of flow passing through the pipe to be determined; and
    means for determining with the signal processor the parameter of flow passing through the pipe using an array processing algorithm, based at least partly on the selected pressure signals received.

* * * * *